US012658986B2

(12) United States Patent
Li et al.

(10) Patent No.: US 12,658,986 B2
(45) Date of Patent: Jun. 16, 2026

(54) CHANNEL INFORMATION REPORTING METHOD AND APPARATUS

(71) Applicant: HUAWEI TECHNOLOGIES CO., LTD., Shenzhen (CN)

(72) Inventors: Ting Li, Shanghai (CN); Ruiqi Ma, Shenzhen (CN); Kai Chen, Shanghai (CN); Xiaohan Wang, Shanghai (CN); Huangping Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 19 days.

(21) Appl. No.: 18/749,286

(22) Filed: Jun. 20, 2024

(65) Prior Publication Data

US 2024/0340046 A1     Oct. 10, 2024

Related U.S. Application Data

(63) Continuation of application No. PCT/CN2022/138857, filed on Dec. 14, 2022.

(30) Foreign Application Priority Data

Dec. 20, 2021     (CN) .......................... 202111564938.2

(51) Int. Cl.
| | |
|---|---|
| *H04L 1/02* | (2006.01) |
| *H04B 7/0417* | (2017.01) |
| *H04B 7/0456* | (2017.01) |
| *H04B 7/06* | (2006.01) |

(52) U.S. Cl.
CPC ......... *H04B 7/0417* (2013.01); *H04B 7/0456* (2013.01); *H04B 7/0632* (2013.01)

(58) Field of Classification Search
CPC .... H04B 7/0626; H04B 7/0617; H04B 7/088; H04B 7/052; H04L 25/0224; H04L 25/0226; H04L 25/0232; H04W 24/10; H04W 56/004; H04W 56/005
USPC .................................. 375/267, 260, 262, 299
See application file for complete search history.

(56) References Cited

U.S. PATENT DOCUMENTS

| | | | |
|---|---|---|---|
| 11,838,151 B1 * | 12/2023 | Jones ................... | H04L 25/0224 |
| 12,407,387 B2 * | 9/2025 | Li ........................... | H04L 5/0094 |
| 2012/0275507 A1 | 11/2012 | Roman et al. | |
| 2015/0124707 A1 * | 5/2015 | Wang ....................... | H04L 1/06 |
| | | | 370/328 |

(Continued)

FOREIGN PATENT DOCUMENTS

| | | |
|---|---|---|
| CN | 103458522 A | 12/2013 |
| CN | 106685623 A | 5/2017 |

*Primary Examiner* — Khai Tran
(74) *Attorney, Agent, or Firm* — Leydig, Voit & Mayer, Ltd.

(57) ABSTRACT

Embodiments of this application provide a channel information reporting method and an apparatus. The method includes: A communication apparatus measures a plurality of reference signals from a plurality of radio access network devices, and determines first delay information and first channel information based on the plurality of reference signals; performs delay compensation on the first channel information based on the first delay information, to determine second channel information; determines a precoding matrix indicator (PMI) based on the second channel information, where the PMI indicates the second channel information; and reports the first delay information and the PMI.

20 Claims, 8 Drawing Sheets

(56)         References Cited

U.S. PATENT DOCUMENTS

| | | | | |
|---|---|---|---|---|
| 2021/0014767 A1* | 1/2021 | Xu | .......................... | H04W 72/23 |
| 2024/0056139 A1* | 2/2024 | Ge | .......................... | H04B 7/0456 |
| 2024/0251270 A1* | 7/2024 | Krishnan | .............. | H04W 76/27 |
| 2025/0055646 A1* | 2/2025 | Lee | ........................ | H04L 5/0048 |

* cited by examiner

200

First radio access
network device

Terminal device

S210: Measure a plurality of
reference signals

S220: Perform channel
measurement based on the reference
signal, to determine channel state
information CSI S230: Channel state information CSI S240: Determine multi-station
channel information based on the
CSI and a codebook structure

300

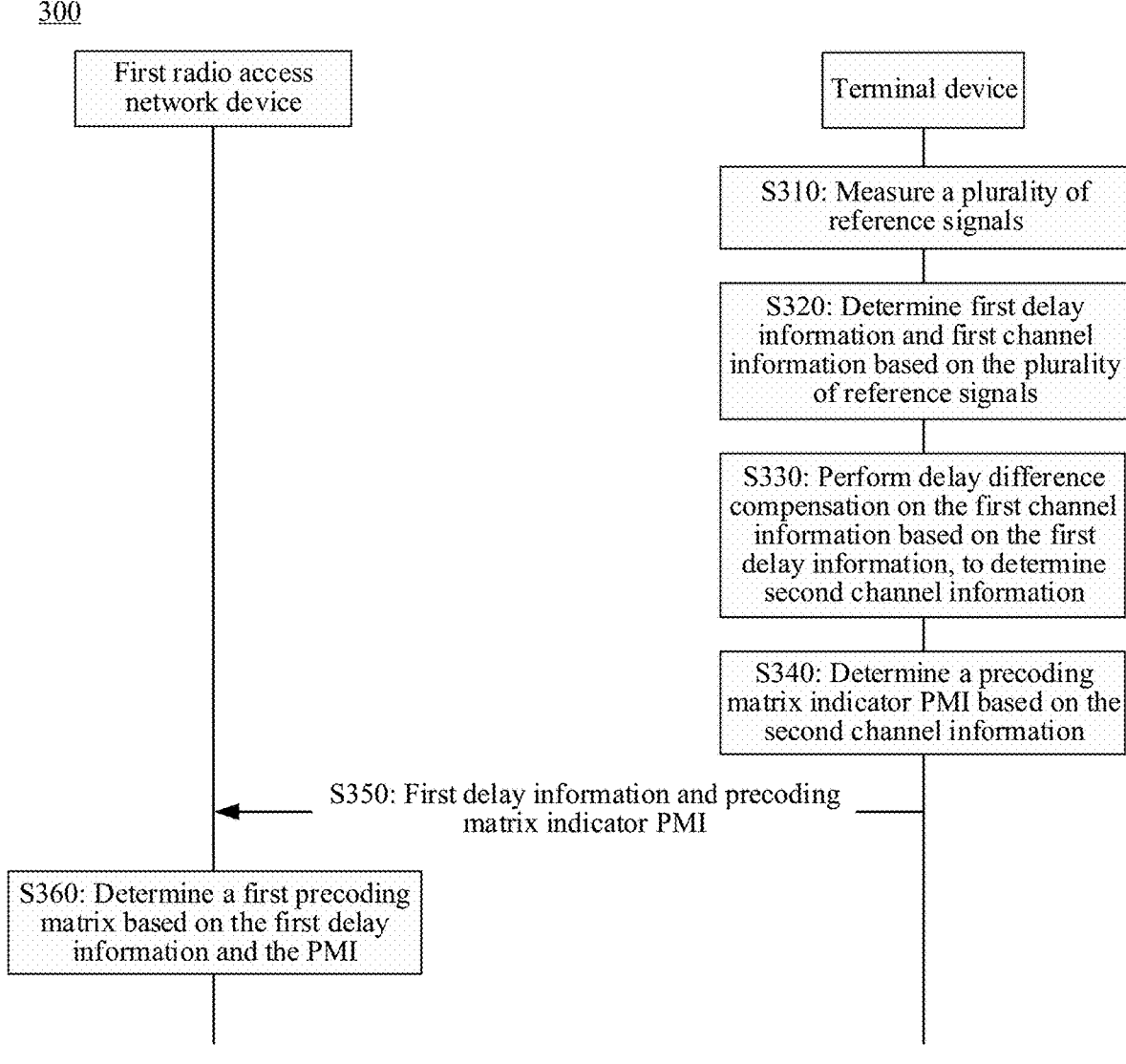

First radio access
network device

Terminal device

S310: Measure a plurality of
reference signals

S320: Determine first delay
information and first channel
information based on the plurality
of reference signals S330: Perform delay difference
compensation on the first channel
information based on the first
delay information, to determine
second channel information S340: Determine a precoding
matrix indicator PMI based on the
second channel information S350: First delay information and precoding
matrix indicator PMI S360: Determine a first precoding
matrix based on the first delay
information and the PMI

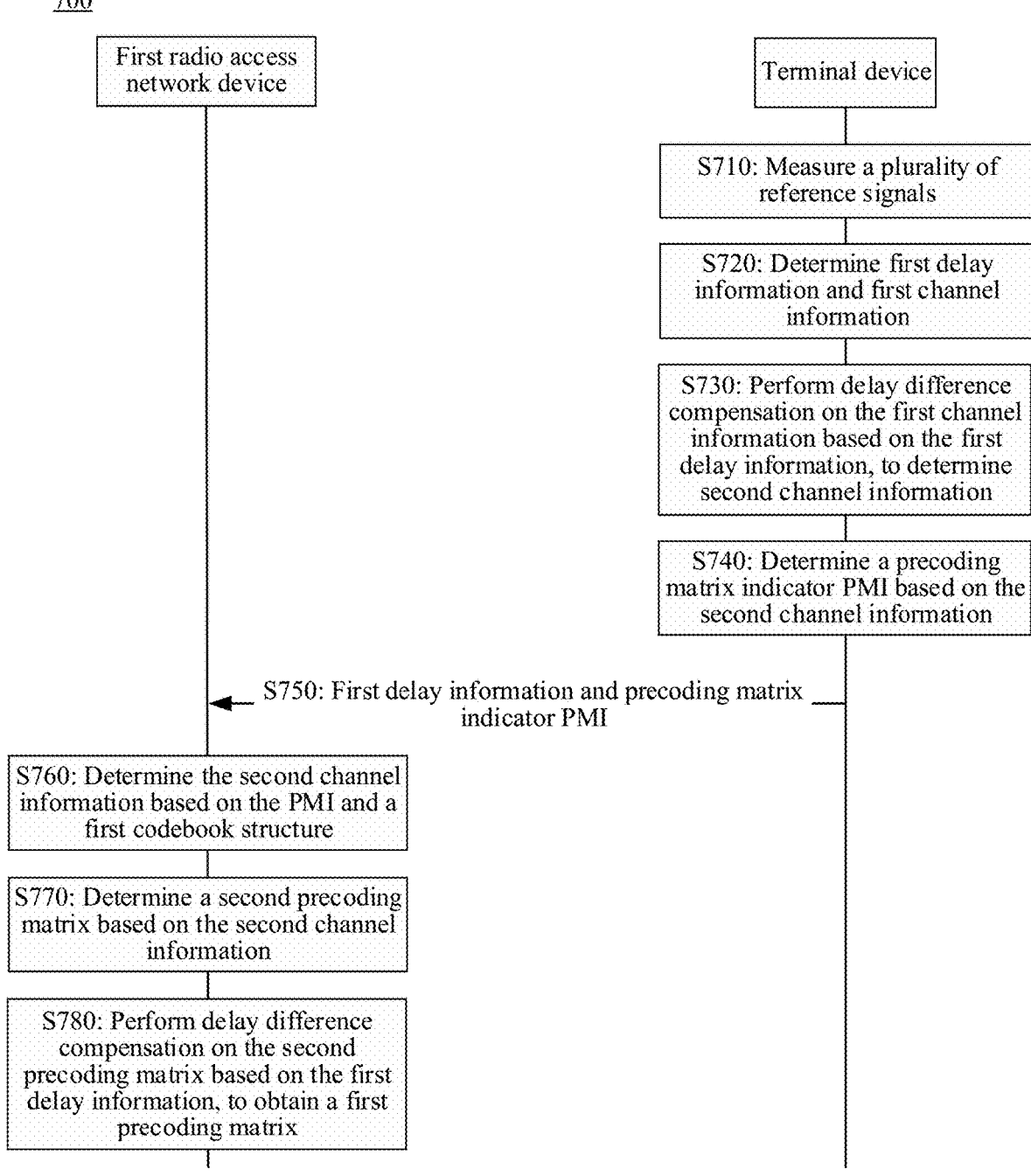

First radio access network device

Terminal device

S710: Measure a plurality of reference signals

S720: Determine first delay information and first channel information

S730: Perform delay difference compensation on the first channel information based on the first delay information, to determine second channel information S740: Determine a precoding matrix indicator PMI based on the second channel information S750: First delay information and precoding matrix indicator PMI S760: Determine the second channel information based on the PMI and a first codebook structure S770: Determine a second precoding matrix based on the second channel information S780: Perform delay difference compensation on the second precoding matrix based on the first delay information, to obtain a first precoding matrix

FIG. 7

CHANNEL INFORMATION REPORTING METHOD AND APPARATUS

CROSS-REFERENCE TO RELATED APPLICATIONS

This application is a continuation of International Application No. PCT/CN2022/138857, filed on Dec. 14, 2022, which claims priority to Chinese Patent Application No. 202111564938.2, filed on Dec. 20, 2021. The disclosures of the aforementioned applications are hereby incorporated by reference in their entireties.

TECHNICAL FIELD

Embodiments of this application relate to the communication field, and more specifically, to a channel information reporting method and an apparatus.

BACKGROUND

A multiple-input multiple-output (MIMO) technology means that a plurality of transmit antennas and a plurality of receive antennas are used at a transmit end and a receive end respectively, so that signals are transmitted and received through a plurality of antennas at the transmit end and the receive end. The multiple-input multiple-output technology plays an important role in spectral efficiency of a system. When the MIMO technology is used, a radio access network device may reduce interference between a plurality of users and interference between a plurality of signal streams of a same user by using a precoding technology, to improve signal quality and spectrum utilization.

The radio access network device may determine a precoding matrix by using a precoding matrix indicator (PMI) fed back by a terminal device. For example, the terminal device may determine, in a manner such as channel measurement, a precoding matrix that adapts to a downlink channel, and feed back the PMI, so that the radio access network device obtains a precoding matrix that has a same or similar precoding vector as the precoding matrix determined by the terminal device. Particularly, when a plurality of radio access network devices coordinate to serve one terminal device (namely, multi-station coordination), the plurality of radio access network devices form a coordinating set of the terminal device. The terminal device needs to jointly measure channel information between the terminal device and the radio access network devices, and feed back the channel information of the radio access network devices in the coordinating set by using the PMI.

A matching degree between the precoding matrix determined by the radio access network device and a channel affects signal transmission quality. However, the precoding matrix is determined based on the channel information fed back by the terminal device. Therefore, how to improve feedback precision of the channel information is an urgent problem to be resolved.

SUMMARY

This application provides a channel information reporting method and an apparatus, so that PMI feedback precision can be improved, thereby improving a matching degree between a precoding matrix and a channel.

According to a first aspect, a channel information reporting method is provided. The method includes: A terminal device measures a plurality of reference signals from a plurality of radio access network devices, where one of the plurality of radio access network devices sends one of the plurality of reference signals. The terminal device determines first delay information and first channel information based on the plurality of reference signals, where the first delay information includes delay information of a part of or all radio access network devices in the plurality of radio access network devices, and the first channel information includes channel information of each of the plurality of radio access network devices. The terminal device performs delay difference compensation on the first channel information based on the first delay information, to determine second channel information. The terminal device determines a precoding matrix indicator PMI based on the second channel information, where the PMI indicates the second channel information. The terminal device reports the first delay information and the PMI.

In the solution provided in this application, the terminal device performs delay difference compensation on the first channel information by using the first delay information, so that second channel information with a small delay spread is determined. A smaller delay spread indicates smaller impact of channel differences of different radio access network devices on amplitudes and phases of different frequency components, and weaker selectivity of different frequency components, so that selectivity of channels on different frequency components can be reduced, that is, frequency selectivity is reduced. In this way, when the second channel information is fed back by using the PMI, because changes of amplitudes and phases of channels of different radio access network devices indicated by the second channel information are small in frequency domain, a PMI feedback channel precision loss is small, and PMI feedback precision is high. Particularly, when a PMI feedback granularity is large, the PMI feedback precision may be significantly improved according to the technical solution provided in this application. The PMI feedback precision is improved, so that a more accurate precoding matrix can be determined, signal transmission quality can be improved, and performance advantages of coordinated multi-station transmission can be fully utilized.

Optionally, the plurality of radio access network devices are radio access network devices in a coordinating set.

With reference to the first aspect, in some embodiments of the first aspect, that the terminal device determines first delay information based on the plurality of reference signals includes: The terminal device measures an air interface delay of a part of or all reference signals in the plurality of reference signals relative to a first reference signal, and determines an air interface delay difference of the part of or all the reference signals, where the first reference signal is one of the plurality of reference signals. The terminal device determines the first delay information based on air interface delay differences of the plurality of reference signals.

It should be understood that the air interface delay difference of the part of or all the reference signals may include an air interface delay difference of a reference signal other than the first reference signal, or may include an air interface delay difference of each of the plurality of reference signals, namely, an air interface delay difference of each of the plurality of reference signals relative to the first reference signal.

In the solution provided in this application, the terminal device may determine the air interface delay difference of the part of or all the reference signals in the plurality of reference signals by measuring air interface delays of different reference signals relative to the first reference signal.

Further, the terminal device may determine the first delay information based on the air interface delay difference of the part of or all the reference signals in the plurality of reference signals. In this embodiment of this application, air interface delay differences of different reference signals are used as parameter bases for determining the first delay information, so that first delay information that is closer to the actual can be determined. When delay difference compensation is performed on the first channel information by using the first delay information, the determined delay spread of the second channel information is small.

With reference to the first aspect, in some embodiments of the first aspect, the first delay information includes the air interface delay difference of the part of or all the reference signals.

In the solution provided in this application, the first delay information reported by the terminal device may include the air interface delay difference of the part of or all the reference signals. In this case, after the terminal device performs delay difference compensation on the first channel information based on the first delay information, it may be ensured that main paths or first paths of channel information of the plurality of radio access network devices are aligned, and second channel information with a minimum delay spread can be determined. A smaller delay spread indicates smaller impact of channel differences of different radio access network devices on amplitudes and phases of different frequency components, and weaker selectivity of the different frequency components, so that frequency selectivity can be reduced to a large extent. In this way, when the second channel information is fed back by using the PMI, because changes of amplitudes and phases of channels of different radio access network devices indicated by the second channel information are small in frequency domain, a PMI feedback channel precision loss is small, and PMI feedback precision is high, so that a more accurate precoding matrix of a downlink channel can be determined, signal transmission quality can be improved, and performance advantages of coordinated multi-station transmission can be fully utilized.

With reference to the first aspect, in some embodiments of the first aspect, that the terminal device determines the first delay information based on the air interface delay difference of the part of or all the reference signals includes: The terminal device determines the first delay information based on the air interface delay difference of the part of or all the reference signals and a first mapping table, where the first mapping table indicates a mapping relationship between an air interface delay difference range of a reference signal and a preset delay offset of a radio access network device, and the first delay information indicates respective delay offsets of the plurality of radio access network devices corresponding to the part of or all the reference signals.

It should be understood that a delay offset of the part of or all the radio access network devices in the plurality of radio access network devices is determined by using the air interface delay difference of the corresponding reference signal and the first mapping table. Optionally, a specific air interface delay difference range may correspond to a preset delay offset.

In the solution provided in this application, the first delay information reported by the terminal device may include the delay offset of the part of or all the radio access network devices. Because the delay offset is determined based on the air interface delay difference of the reference signal, after delay difference compensation is performed on the first channel information based on the first delay information, it may be ensured that main paths or first paths of channel information of the plurality of radio access network devices are aligned, or are aligned within a specific error range, so that second channel information with a small delay spread can be determined, to reduce frequency selectivity as much as possible, and improve PMI feedback precision.

With reference to the first aspect, in some embodiments of the first aspect, the first delay information includes a plurality of index values, and one of the plurality of index values indicates a delay offset of one of the part of or all the radio access network devices.

In the solution provided in this application, the first delay information reported by the terminal device may include the plurality of index values corresponding to the delay offsets of the plurality of radio access network devices. Because a specific value of the delay offset does not need to be reported, signaling overheads may be reduced to some extent.

With reference to the first aspect, in some embodiments of the first aspect, the air interface delay difference of the part of or all the reference signals includes a delay difference of a main path, of each of the part of or all the reference signals, relative to a main path of the first reference signal; or the air interface delay difference of the part of or all the reference signals includes a delay difference of a first path, of each of the part of or all the reference signals, relative to a first path of the first reference signal.

With reference to the first aspect, in some embodiments of the first aspect, the first reference signal is the $1^{st}$ reference signal received by the terminal device in the plurality of reference signals.

With reference to the first aspect, in some embodiments of the first aspect, that the terminal device performs delay difference compensation on the first channel information based on the first delay information includes: The terminal device performs linear phase compensation on the first channel information in frequency domain based on the first delay information, so that main paths or first paths of channel information of the plurality of radio access network devices are aligned.

It should be understood that, that the main paths or the first paths of the plurality of radio access network devices are aligned may include: the main paths or the first paths of the plurality of radio access network devices are aligned, or delay differences of the main paths of the plurality of radio access network devices fall within a preset error range or delay differences of the first paths of the plurality of radio access network devices fall within a preset error range. Linear phase compensation is performed on the first channel information in frequency domain, so that frequency selectivity can be reduced, thereby improving PMI feedback precision.

In the solution provided in this application, the terminal device performs linear phase compensation on the first channel information to implement delay difference compensation, so that it can be ensured that the main paths or the first paths of the channel information of the plurality of radio access network devices are aligned, or it can be ensured that the main paths or the first paths of the channel information of the plurality of radio access network devices fall within the preset error range, and frequency selectivity can be reduced to different degrees. When the second channel information is fed back by using the PMI, the PMI feedback precision is improved, and the radio access network device may determine a more accurate precoding matrix of a downlink channel, so that signal transmission quality can be improved, and performance advantages of coordinated multi-station transmission can be fully utilized.

According to a second aspect, a channel information reporting method is provided. The method includes: A first radio access network device receives first delay information and a precoding matrix indicator PMI that are sent by a terminal device, where the first delay information includes delay information of a part of or all radio access network devices in a plurality of radio access network devices, the PMI indicates second channel information, the second channel information is determined by performing delay difference compensation on first channel information by using the first delay information, and the first channel information includes channel information of each radio access network device in the plurality of radio access network devices. The first radio access network device determines a first precoding matrix based on the first delay information and the PMI, where the first precoding matrix matches the first channel information.

It should be understood that the first radio access network device may be any one of the plurality of radio access network devices, or may be a radio access network device other than the plurality of radio access network devices that form a coordinating set of the terminal device. In other words, the first radio access network device may send a reference signal to the terminal device, or may not send a reference signal to the terminal device. This is not limited in this application.

Optionally, the first channel information is obtained by measuring a plurality of reference signals in the plurality of reference signals received by the terminal device, the plurality of reference signals are in one-to-one correspondence with the plurality of radio access network devices, and one of the plurality of radio access network devices sends one of the plurality of reference signals.

In the solution provided in this application, the first radio access network device determines, based on the first delay information and the precoding matrix indicator PMI that are reported by the terminal device, the first precoding matrix that matches the first channel information. That is, the first precoding matrix can match a real channel for transmitting data. When the first precoding matrix is used for data transmission, data transmission performance can be ensured, so that signal transmission quality can be improved, and performance advantages of coordinated multi-station transmission can be fully utilized.

With reference to the second aspect, in some embodiments of the second aspect, that the first radio access network device determines a first precoding matrix based on the first delay information and the PMI includes: The first radio access network device obtains the first channel information based on the first delay information, the PMI, a first codebook structure, and a second codebook structure. The first radio access network device obtains the first precoding matrix based on the first channel information.

In the solution provided in this application, the first radio access network device restores the first channel information by using the first codebook structure and the second codebook structure and with reference to the first delay information and the PMI, to determine the first precoding matrix that matches the first channel information. The first precoding matrix can match a real channel for transmitting data. When the first precoding matrix is used for data transmission, data transmission performance can be ensured, and performance advantages of coordinated multi-station transmission can be fully utilized.

With reference to the second aspect, in some embodiments of the second aspect, that the first radio access network device obtains the first channel information based on the first delay information, the PMI, a first codebook structure, and a second codebook structure includes: The first radio access network device obtains the second channel information based on the PMI and the first codebook structure. The first radio access network device obtains the first channel information based on the first delay information, the second channel information, and the second codebook structure.

It should be understood that the first codebook structure is a multi-station codebook structure applicable to a coordinated multi-station scenario. The second channel information may be determined by using the first codebook structure. A form of the first codebook structure is not limited herein.

It should be understood that the second codebook structure is a newly designed codebook structure, and the second channel information may be restored to the first channel information by using the second codebook structure.

It should be further understood that the first codebook structure and the second codebook structure may be independent of each other, or may be nested together.

In the solution provided in this application, the first radio access network device first restores the second channel information by using the first codebook structure and the PMI, that is, obtains channel information obtained after delay difference compensation is performed, and then performs calculation on the second channel information by using the first delay information and with reference to the second codebook structure, to determine the first channel information similar to real channel information.

With reference to the second aspect, in some embodiments of the second aspect, the second codebook structure includes a delay parameter, the first delay information indicates a value of the delay parameter, and the second channel information is determined by performing linear phase compensation on the first channel information in frequency domain by using the first delay information; and that the first radio access network device obtains the first channel information based on the first delay information, the second channel information, and the second codebook structure includes: the first radio access network device performs linear phase inverse compensation on the second channel information in frequency domain based on the second codebook structure and the value of the delay parameter, to determine the first channel information.

In the solution provided in this application, the second codebook structure includes the delay parameter, and the first radio access network device performs linear phase inverse compensation on the second channel information in frequency domain based on the second codebook structure and the value of the delay parameter, to determine the first channel information corresponding to a real channel.

With reference to the second aspect, in some embodiments of the second aspect, that the first radio access network device determines a first precoding matrix based on the first delay information and the PMI includes: The first radio access network device obtains the second channel information based on the PMI and a first codebook structure. The first radio access network device determines a second precoding matrix based on the second channel information, where the second precoding matrix matches the second channel information. The first radio access network device performs delay difference compensation on the second precoding matrix based on the first delay information, to determine the first precoding matrix.

In the solution provided in this application, the first radio access network device first restores the second channel information by using the first codebook structure and the PMI, then determines the second precoding matrix that matches the second channel information, and finally directly performs delay difference compensation on the second precoding matrix based on the first delay information reported by the terminal device, to determine the first precoding matrix that matches the first channel information.

With reference to the second aspect, in some embodiments of the second aspect, the first delay information is determined based on an air interface delay difference of a part of or all reference signals in the plurality of reference signals received by the terminal device, and the air interface delay difference of the part of or all the reference signals is determined by measuring an air interface delay of the part of or all the reference signals in the plurality of reference signals relative to a first reference signal.

With reference to the second aspect, in some embodiments of the second aspect, the first delay information includes the air interface delay difference of the part of or all the reference signals.

Specifically, the first delay information includes an air interface delay difference of each of the plurality of reference signals.

With reference to the second aspect, in some embodiments of the second aspect, the first delay information includes a plurality of index values, one of the plurality of index values indicates a delay offset of one of the part of or all the radio access network devices, and delay offsets of the plurality of radio access network devices are determined based on the air interface delay difference of the part of or all the reference signals and a first mapping table, where the first mapping table indicates a mapping relationship between an air interface delay difference range of a reference signal and a preset delay offset of a radio access network device.

With reference to the second aspect, in some embodiments of the second aspect, the air interface delay difference of the part of or all the reference signals includes a delay difference of a main path, of each of the part of or all the reference signals, relative to a main path of the first reference signal; or the air interface delay difference of the part of or all the reference signals includes a delay difference of a first path, of each of the part of or all the reference signals, relative to a first path of the first reference signal.

With reference to the second aspect, in some embodiments of the second aspect, the first reference signal is the $1^{st}$ reference signal received by the terminal device in the plurality of reference signals.

According to a third aspect, a terminal device is provided. The terminal device includes a processing unit and a sending unit. The processing unit is configured to: measure a plurality of reference signals from a plurality of radio access network devices, where one of the plurality of radio access network devices sends one of the plurality of reference signals; determine first delay information and first channel information based on the plurality of reference signals, where the first delay information includes delay information of a part of or all radio access network devices in the plurality of radio access network devices, and the first channel information includes channel information of each of the plurality of radio access network devices; perform delay difference compensation on the first channel information based on the first delay information, to determine second channel information; and determine a precoding matrix indicator PMI based on the second channel information, where the PMI indicates the second channel information. The sending unit is configured to report the first delay information and the PMI.

With reference to the third aspect, in some embodiments of the third aspect, the processing unit is specifically configured to: measure an air interface delay of a part of or all reference signals in the plurality of reference signals relative to a first reference signal, and determine an air interface delay difference of the part of or all the reference signals, where the first reference signal is one of the plurality of reference signals; and determine the first delay information based on air interface delay differences of the plurality of reference signals.

With reference to the third aspect, in some embodiments of the third aspect, the first delay information includes the air interface delay difference of the part of or all the reference signals.

With reference to the third aspect, in some embodiments of the third aspect, the processing unit is specifically configured to determine the first delay information based on the air interface delay difference of the part of or all the reference signals and a first mapping table, where the first mapping table indicates a mapping relationship between an air interface delay difference range of a reference signal and a preset delay offset of a radio access network device, and the first delay information indicates a delay offset of each of the plurality of radio access network devices corresponding to the part of or all the reference signals.

With reference to the third aspect, in some embodiments of the third aspect, the first delay information includes a plurality of index values, and one of the plurality of index values indicates a delay offset of one of the part of or all the radio access network devices.

With reference to the third aspect, in some embodiments of the third aspect, the air interface delay difference of the part of or all the reference signals includes a delay difference of a main path, of each of the part of or all the reference signals, relative to a main path of the first reference signal; or the air interface delay difference of the part of or all the reference signals includes a delay difference of a first path, of each of the part of or all the reference signals, relative to a first path of the first reference signal.

With reference to the third aspect, in some embodiments of the third aspect, the first reference signal is the $1^{st}$ reference signal received by the receiving unit in the plurality of reference signals.

With reference to the third aspect, in some embodiments of the third aspect, the processing unit is specifically configured to perform linear phase compensation on the first channel information in frequency domain based on the first delay information, so that main paths or first paths of channel information of the plurality of radio access network devices are aligned.

It should be understood that, that the main paths or the first paths of the plurality of radio access network devices are aligned may include: the main paths or the first paths of the plurality of radio access network devices are aligned, or delay differences of the main paths of the plurality of radio access network devices fall within a preset error range or delay differences of the first paths of the plurality of radio access network devices fall within a preset error range.

For beneficial effect of the apparatus in the third aspect, refer to beneficial effect of the method in the first aspect. Details are not described herein again.

According to a fourth aspect, a radio access network device is provided. The radio access network device includes a receiving unit and a processing unit. The receiving unit is configured to receive first delay information and a precoding matrix indicator PMI that are sent by a terminal device, where the first delay information includes delay information of a part of or all radio access network devices in a plurality of radio access network devices, the PMI indicates second channel information, the second channel information is determined by performing delay difference compensation on first channel information by using the first delay information, and the first channel information includes channel information of each radio access network device in the plurality of radio access network devices. The processing unit is configured to determine a first precoding matrix based on the first delay information and the PMI, where the first precoding matrix matches the first channel information.

With reference to the fourth aspect, in some embodiments of the fourth aspect, the processing unit is specifically configured to: obtain the first channel information based on the first delay information, the PMI, a first codebook structure, and a second codebook structure; and obtain the first precoding matrix based on the first channel information.

With reference to the fourth aspect, in some embodiments of the fourth aspect, the processing unit is specifically configured to: obtain the second channel information based on the PMI and the first codebook structure; and obtain the first channel information based on the first delay information, the second channel information, and the second codebook structure.

With reference to the fourth aspect, in some embodiments of the fourth aspect, the second codebook structure includes a delay parameter, the first delay information indicates a value of the delay parameter, and the second channel information is determined by performing linear phase compensation on the first channel information in frequency domain by using the first delay information; and the processing unit is specifically configured to perform linear phase inverse compensation on the second channel information in frequency domain based on the second codebook structure and the value of the delay parameter, to determine the first channel information.

With reference to the fourth aspect, in some embodiments of the fourth aspect, the processing unit is specifically configured to: obtain the second channel information based on the PMI and a first codebook structure; determine a second precoding matrix based on the second channel information, where the second precoding matrix matches the second channel information; and perform delay difference compensation on the second precoding matrix based on the first delay information, to determine the first precoding matrix.

With reference to the fourth aspect, in some embodiments of the fourth aspect, the first delay information is determined based on an air interface delay difference of a part of or all reference signals in the plurality of reference signals received by the terminal device, and the air interface delay difference of the part of or all the reference signals is determined by measuring an air interface delay of the part of or all the reference signals in the plurality of reference signals relative to a first reference signal.

With reference to the fourth aspect, in some embodiments of the fourth aspect, the first delay information includes the air interface delay difference of the part of or all the reference signals.

With reference to the fourth aspect, in some embodiments of the fourth aspect, the first delay information includes a plurality of index values, one of the plurality of index values indicates a delay offset of one of the part of or all the radio access network devices, and delay offsets of the plurality of radio access network devices are determined based on the air interface delay difference of the part of or all the reference signals and a first mapping table, where the first mapping table indicates a mapping relationship between an air interface delay difference range of a reference signal and a preset delay offset of a radio access network device.

With reference to the fourth aspect, in some embodiments of the fourth aspect, the air interface delay difference of the part of or all the reference signals includes a delay difference of a main path, of each of the part of or all the reference signals, relative to a main path of the first reference signal; or the air interface delay difference of the part of or all the reference signals includes a delay difference of a first path, of each of the part of or all the reference signals, relative to a first path of the first reference signal.

With reference to the fourth aspect, in some embodiments of the fourth aspect, the first reference signal is the $1^{st}$ reference signal received by the receiving unit in the plurality of reference signals.

For beneficial effect of the apparatus in the fourth aspect, refer to beneficial effect of the method in the second aspect. Details are not described herein again.

According to a fifth aspect, a communication apparatus is provided. The communication apparatus includes at least one processor and a communication interface. The communication interface is used by the communication apparatus to exchange information with another communication apparatus. When program instructions are executed in the at least one processor, the communication apparatus is enabled to perform the method according to any one of the first aspect or the embodiments of the first aspect.

Optionally, the communication apparatus may further include a memory. The memory is coupled to the processor. The processor is configured to implement the method described in any one of the first aspect or the embodiments of the first aspect. For example, the memory is configured to store instructions and data. When executing the instructions stored in the memory, the processor may implement the method described in any one of the first aspect or the embodiments of the first aspect.

Optionally, the communication interface may be a transceiver, a circuit, a bus, a module, a pin, or another type of communication interface.

Optionally, the communication apparatus in the fifth aspect may be a terminal device, or may be a component (for example, a chip or a circuit) used in the terminal device. The another communication apparatus may be a radio access network device, or may be a component (for example, a chip or a circuit) used in the radio access network device.

According to a sixth aspect, a communication apparatus is provided. The communication apparatus includes at least one processor and a communication interface. The communication interface is used by the communication apparatus to exchange information with another communication apparatus. When program instructions are executed in the at least one processor, the communication apparatus is enabled to perform the method according to any one of the second aspect or the embodiments of the second aspect.

Optionally, the communication apparatus may further include a memory. The memory is coupled to the processor. The processor is configured to implement the method described in any one of the second aspect or the embodiments of the second aspect. For example, the memory is configured to store instructions and data. When executing the instructions stored in the memory, the processor may implement the method described in any one of the second aspect or the embodiments of the second aspect.

Optionally, the communication interface may be a transceiver, a circuit, a bus, a module, a pin, or another type of communication interface.

Optionally, the communication apparatus in the sixth aspect may be a radio access network device, or may be a component (for example, a chip or a circuit) used in the radio access network device. The another communication apparatus may be a terminal device, or may be a component (for example, a chip or a circuit) used in the terminal device.

According to a seventh aspect, a chip system is provided. The chip system includes a processor, configured to implement, by a terminal device, a function according to any one of the first aspect or the embodiments of the first aspect, for example, receiving, sending, or processing data and/or information in the foregoing method. In a possible design, the chip system further includes a memory. The memory is configured to store program instructions and data that are necessary for the terminal device. The chip system may include a chip, or may include a chip and another discrete component.

According to an eighth aspect, a chip system is provided. The chip system includes a processor, configured to implement, by a radio access network device, a function according to any one of the second aspect or the embodiments of the second aspect, for example, receiving, sending, or processing data and/or information in the foregoing method. In a possible design, the chip system further includes a memory. The memory is configured to store program instructions and data that are necessary for the terminal device. The chip system may include a chip, or may include a chip and another discrete component.

According to a ninth aspect, a computer-readable storage medium is provided. The computer-readable storage medium stores a computer program or instructions. When the computer program or the instructions is/are executed, the method according to any one of the first aspect or the embodiments of the first aspect is implemented.

According to a tenth aspect, a computer-readable storage medium is provided. The computer-readable storage medium stores a computer program or instructions. When the computer program or the instructions is/are executed, the method according to any one of the second aspect or the embodiments of the second aspect is implemented.

According to an eleventh aspect, a computer program product is provided. The computer program product includes computer program code. When the computer program code is run on a computer, the computer is enabled to perform the method according to any one of the first aspect or the embodiments of the first aspect.

According to a twelfth aspect, a computer program product is provided. The computer program product includes computer program code. When the computer program code is run on a computer, the computer is enabled to perform the method according to any one of the second aspect or the embodiments of the second aspect.

According to a thirteenth aspect, a communication system is provided. The communication system includes the terminal device described in the third aspect and the radio access network device described in the fourth aspect; or the communication system includes the communication apparatus described in the fifth aspect and the communication apparatus described in the sixth aspect.

It may be understood that any communication apparatus, chip system, computer-readable storage medium, computer program product, or the like provided above is configured to perform the corresponding method provided above. Therefore, for beneficial effect that can be achieved by the communication apparatus, the chip system, the computer-readable storage medium, the computer program product, or the like, refer to beneficial effect in the corresponding method. Details are not described herein again.

BRIEF DESCRIPTION OF DRAWINGS

FIG. 3 is a schematic flowchart of a channel information reporting method according to this application;

FIG. 7 is a schematic flowchart of still another channel information reporting method according to this application;

DESCRIPTION OF EMBODIMENTS

Figure 1:
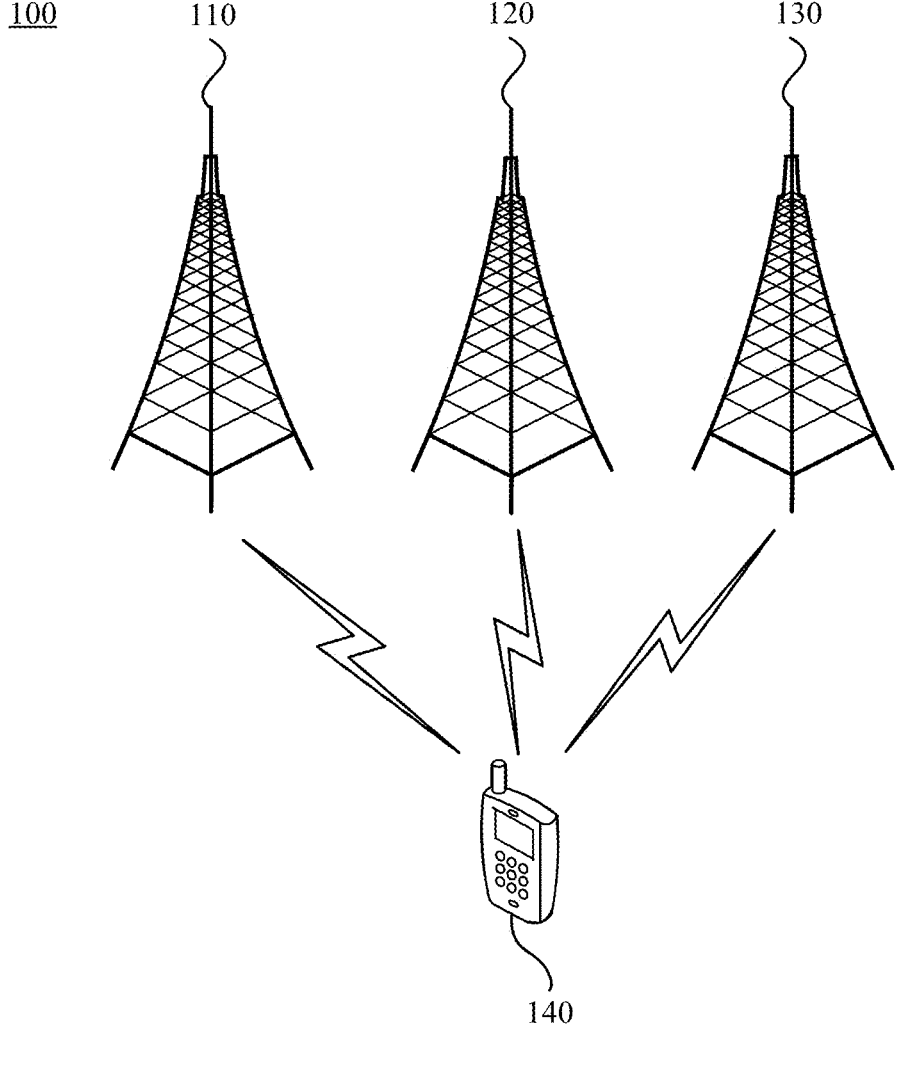
FIG. 1 is a diagram of a communication system to which this application is applicable.

The following describes technical solutions of embodiments in this application with reference to accompanying drawings.

In this application, "at least one" means one or more, and "a plurality of" means two or more. In addition, in embodiments of this application, "first", "second", and various numeric numbers are merely used for distinguishing for ease of description, and are not intended to limit the scope of embodiments of this application. The sequence numbers of the processes described below do not mean execution sequences. The execution sequences of the processes should be determined based on functions and internal logic of the processes, and should not constitute any limitation on implementation processes of embodiments of this application. In addition, in embodiments of this application, words such as "210", "510", and "610" are merely identifiers for ease of description, and do not limit a sequence of performing steps.

In this application, "indicate" may include "directly indicate" and "indirectly indicate". When a piece of indication information indicates A, the indication information may directly indicate A or indirectly indicate A, but it does not indicate that the indication information definitely carries A. In embodiments of this application, descriptions such as "when . . . ", "in a case of . . . ", "if", and "provided that" all mean that a device performs corresponding processing in an objective case, and are not limited to time, and the device is not required to perform a determining action during implementation. The descriptions do not mean that there is another limitation.

It should be noted that in this application, the term such as "example" or "for example" represents giving an example, an illustration, or a description. Any embodiment or design scheme described as an "example" or "for example" in this application should not be explained as being more preferred or having more advantages than another embodiment or design scheme. To be precise, use of the term such as "example" or "for example" is intended to present a relative concept in a specific manner.

The technical solutions in embodiments of this application may be applied to various communication systems, for example, a global system for mobile communications (GSM) system, a code division multiple access (CDMA) system, a wideband code division multiple access (WCDMA) system, a general packet radio service (general packet radio service, GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, and a 5th generation (5G) mobile communication system or a new radio access technology (NR), and are particularly applicable to a scenario in which channel information needs to be fed back, for example, a wireless network using a massive multiple-input multiple-output (M-MIMO) technology or a wireless network using a distributed antenna technology. The technical solutions provided in this application may be further applied to a future communication system, for example, a 6th generation mobile communication system.

For ease of understanding of embodiments of this application, a communication system to which embodiments of this application are applicable is first described in detail with reference to FIG. 1.

FIG. 1 is a diagram of a communication system 100 to which an embodiment of this application is applicable. As shown in FIG. 1, the communication system 100 may include a plurality of radio access network devices, for example, a radio access network device 110, a radio access network device 120, and a radio access network device 130 shown in FIG. 1. The communication system 100 further includes at least one terminal device, for example, a terminal device 140 shown in FIG. 1.

It should be understood that quantities of radio access network devices and terminal devices shown in FIG. 1 are merely examples, and the communication system 100 may further include more radio access network devices and terminal devices.

The radio access network device may communicate with the terminal device. As shown in FIG. 1, the radio access network device 110, the radio access network device 120, and the radio access network device 130 may all communicate with the terminal device 140. This scenario may also be referred to as multi-station transmission. In some scenarios, the radio access network device 110, the radio access network device 120, and the radio access network device 130 may provide services for the terminal device 140 in a coordinated manner. For the terminal device 140, the radio access network device 110, the radio access network device 120, and the radio access network device 130 may be equivalent to an entirety to perform data transmission with the terminal device 140. In other words, the radio access network device 110, the radio access network device 120, and the radio access network device 130 may provide the service for the terminal device 140 in a coordinated multi-station manner.

It should be understood that the terminal device in the communication system 100 may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus.

The terminal device may be a device that provides voice/data connectivity for a user, for example, a handheld device or a vehicle-mounted device having a wireless connection function; may be a device in internet of vehicles communication, for example, a communication terminal uploaded by a vehicle or a road side unit (RSU); may be a communication terminal on an unmanned aerial vehicle; or may be a terminal device in an internet of things (IoT) system.

For example, the terminal device includes but is not limited to: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a wearable device, a terminal device in a 5G network, a terminal device in a future evolved public land mobile network (PLMN), or the like. This is not limited in embodiments of this application.

It should be understood that the radio access network device (for example, the radio access network devices 110, 120, and 130) in the communication system 100 may be a device that can connect the terminal device to a wireless network. The radio access network device may also be referred to as a radio access network (RAN) node, a network device, or an access network device. For example, the radio access network device may be a base station.

The base station in embodiments of this application may cover various names in a broad sense, or may be replaced with the following names, for example, a NodeB, an evolved NodeB (eNB), a next generation NodeB (gNB), a relay station, an access point, a transmission reception point (TRP), a transmission point (TP), a master eNodeB (MeNB), a secondary eNodeB (SeNB), a multi-standard radio (MSR) node, a home base station, a network controller, an access node, a radio node, an access point (AP), a transmission node, a transceiver node, a baseband unit (BBU), a remote radio unit (remote radio unit, RRU), an active antenna unit (AAU), a remote radio head (RRH), a central unit (CU), a distributed unit (DU), a positioning node, and the like. The base station may be a macro base station, a micro base station, a relay node, a donor node, an analogue, or a combination thereof. The base station may alternatively be a communication module, a modem, or a chip that is disposed in the foregoing device or apparatus. The base station may alternatively be a network side device in a 6G network, a device that undertakes a base station function in a future communication system, or the like. The base station may support networks of a same access technology or different access technologies. A specific technology and a specific device form that are used by the radio access network device are not limited in embodiments of this application.

The base station may be fixed or mobile. For example, a helicopter or an unmanned aerial vehicle may be configured as a mobile base station, and one or more cells may move based on a location of the mobile base station. In another example, a helicopter or an unmanned aerial vehicle may be configured as a device for communicating with another base station.

In some deployments, the radio access network device in embodiments of this application may be a CU or a DU, or the radio access network device includes a CU and a DU. The gNB may further include an active antenna unit (AAU). The CU implements some functions of the gNB, and the DU implements some functions of the gNB. For example, the CU is responsible for processing a non-real-time protocol and a service, and implements functions of a radio resource control (RRC) layer and a packet data convergence protocol (PDCP) layer. The DU is responsible for processing a physical layer protocol and a real-time service, and implementing functions of a radio link control (RLC) layer, a medium access control (medium access control, MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. In addition, the CU may serve as a network device in an access network (RAN), or the CU may serve as a network device in a core network (CN).

It should be understood that the communication system and the communication scenario shown in FIG. 1 are merely examples, and this application is not limited thereto. Embodiments of this application are applicable to any communication scenario in which a transmit-end device communicates with a receive-end device.

For ease of understanding embodiments of this application, the following first briefly describes several terms in this application.

1. MIMO Technology

Mainly functions of the MIMO technology are to provide spatial diversity or spatial multiplexing gains. MIMO uses a plurality of transmit antennas to transmit signals with same information through different paths. In addition, a receive-end device may obtain a plurality of independently fading signals of a same data symbol, to improve receiving reliability. Space diversity of the MIMO technology may be used to resist channel fading. A plurality of antennas using MIMO provide more spatial-domain degrees of freedom and uses independence of spatial channels, to simultaneously transmit a plurality of data streams. Spatial multiplexing of the MIMO technology may increase a quantity of transmission streams, expand a system capacity, and increase a transmission rate. When the MIMO technology is used, before sending data to user equipment, a radio access network device needs to perform modulation and coding and signal precoding.

2. Precoding Technology

According to the precoding technology, not only interference between a plurality of users in a MIMO system can be effectively suppressed, but also a system capacity can be significantly increased while an algorithm of a receive-end device is greatly simplified. Specifically, when a state of a channel between a sending device and a receiving device is known, the sending device (for example, a radio access network device) may process a to-be-sent signal by using a precoding matrix that matches the channel state, so that the to-be-sent signal on which precoding is performed adapts to the channel, to reduce complexity of eliminating impact between channels by the receiving device (for example, a terminal device). Precoding processing is performed on the to-be-sent signal, so that quality of the received signal (for example, a signal to interference plus noise ratio (SINR)) can be improved. Therefore, by using the precoding technology, a sending device and a plurality of receiving devices may perform transmission on a same time-frequency resource, that is, multi-user multiple-input multiple-output (MU-MIMO) is implemented.

It should be understood that related descriptions of the precoding technology are merely an example for ease of understanding, and are not intended to limit the protection scope of embodiments of this application. In a specific implementation process, the sending device may alternatively perform precoding in another manner. For example, when channel information (for example, but not limited to a channel matrix) cannot be obtained, precoding or the like is performed by using a preset precoding matrix or in a weighted processing manner. For brevity, specific content thereof is not described in this specification again.

3. Channel State Information (CSI)

The channel state information CSI is information that is reported by a receive end (for example, a terminal device) to a transmit end (for example, a radio access network device) and that is used to describe a channel attribute of a communication link between the receive end and the transmit end. The CSI includes but is not limited to: a precoding matrix indicator (PMI), a rank indicator (RI), a channel quality indicator (CQI), a channel state information reference signal (CSI-RS), a channel state information reference signal resource indicator (CRI), a layer indicator (LI), and the like.

It should be understood that the foregoing listed specific content of the CSI is merely an example for description, and shall not constitute any limitation on this application. The CSI may include one or more of the foregoing enumerated items, or may include other information used to represent a channel state in addition to the foregoing enumerated items. This is not limited in this application.

To obtain a precoding matrix that can adapt to a channel, the transmit end usually performs channel estimation in advance in a manner of sending a reference signal, and obtains a feedback from the receive end, to determine an accurate precoding matrix to perform precoding processing on to-be-sent data. Specifically, the transmit end may be the radio access network device, and the receive end may be the terminal device. The reference signal may be a reference signal used for downlink channel measurement, for example, the channel state information reference signal (CSI-RS). The terminal device may perform CSI measurement based on the received CSI-RS, and feed back CSI of a downlink channel to the radio access network device.

4. Precoding Matrix Indicator PMI

The precoding matrix indicator PMI may indicate a precoding matrix, and determine precoding used when the radio access network device sends data to the terminal device. The precoding matrix may be, for example, a precoding matrix determined by the terminal device based on a channel matrix of each frequency domain unit. The channel matrix may be determined by the terminal device through channel estimation or in another manner or based on channel reciprocity. However, it should be understood that a specific method of determining the precoding matrix by the terminal device is not limited to the foregoing descriptions. For specific implementations, refer to the conventional technology. For brevity, implementations are not enumerated herein.

The precoding matrix determined by the terminal device may be referred to as a to-be-fed-back precoding matrix, or a to-be-reported precoding matrix. The terminal device may indicate the to-be-fed-back precoding matrix by using the PMI, so that the radio access network device restores the precoding matrix based on the PMI. A precoding matrix restored by the radio access network device based on the PMI may be the same as or similar to the to-be-fed-back precoding matrix. In downlink channel measurement, a higher degree of approximation between a precoding matrix determined by the radio access network device based on the PMI and a precoding matrix determined by the terminal device indicates higher adaptability between the precoding matrix determined by the radio access network device for data transmission and the downlink channel, and higher signal transmission quality.

The precoding matrix indicator PMI may also indicate a channel matrix (which may also be referred to as channel information or the like). In a coordinated multi-station scenario, the PMI may indicate channel matrices (which may also be referred to as multi-station channel matrices or multi-station channel information) of a plurality of radio access network devices. The terminal device may indicate the channel matrix to the radio access network device by using the PMI, so that the radio access network device restores the channel matrix based on the PMI, to determine the precoding matrix used for data transmission.

It should be understood that the PMI is merely a name, and should not constitute any limitation on this application. This application does not preclude a possibility of defining signaling with another name for a same or similar function in a future protocol.

5. Feedback Granularity

In this application, the feedback granularity is a frequency domain feedback granularity of the PMI, namely, a minimum PMI feedback unit. The minimum PMI feedback unit is a PMI sub-band. One PMI sub-band includes several resource blocks (RBs), and each RB includes a plurality of resource elements (REs). Each PMI sub-band feeds back one PMI For example, when the feedback granularity of the PMI is two RBs. To be specific, the PMI sub-band includes two RBs, the terminal device reports one PMI every two RBs in frequency domain, that is, the PMI indicates a precoding matrix or a channel matrix corresponding to the two RBs.

6. Delay Spread

In consideration of a multi-path propagation environment, during actual transmission, signals received by the receive end are combined signals that pass through different paths and have time differences. Different path lengths cause different signal arrival time. Therefore, the signal received by the receive end not only includes a pulse signal sent by the transmit end, but also includes each delay signal of the pulse signal. This phenomenon of extending a pulse width of the received signal due to multi-path effect is referred to as the delay spread. The delay spread may be defined as a difference between a maximum transmission delay and a minimum transmission delay, namely, a difference between arrival time of a last identifiable delay signal and arrival time of the 1st delay signal, which is actually pulse broadening time. The delay spread is an important indicator for measuring multi-path propagation channel quality.

7. Main Path and First Path

In the multi-path propagation environment, signals received by the receive end are combined signals of signals that pass through different paths and have time differences. The first path is a delay path of the $1^{st}$ arrived delay signal, namely, the $1^{st}$ arrival path. The main path is a delay path of a signal component with highest strength in all delay signals, namely, the strongest path.

8. Codebook Structure

The codebook structure reflects a relationship between a PMI reporting amount and a fed-back precoding matrix or channel information. The terminal device may obtain a channel matrix through measurement based on a reference signal, and determine the PMI based on the channel matrix and the codebook structure. The radio access network device may restore the channel matrix based on the PMI and the codebook structure that are fed back by the terminal device.

9. CSI-RS Identifier

The CSI-RS identifier (CSI-RS ID) is used to distinguish between CSI-RSs received by the terminal device from a plurality of radio access network devices. The plurality of radio access network devices may send CSI-RSs on different resources, or may send CSI-RSs on a same resource but different CSI-RS ports. The terminal device may distinguish, based on a resource identifier (resource ID) or a CSI-RS port number, CSI-RSs sent by the plurality of radio access network devices, and number each CSI-RS. This is the CSI-RS identifier. It should be understood that the CSI-RS identifier is merely a name, and should not constitute any limitation on this application.

10. Frequency Selectivity

In consideration of the multi-path propagation environment, electromagnetic waves sent from a transmit antenna at a same moment reach a receive antenna at different time along different paths, and are superimposed on antenna field effect, resulting in mixing of multi-path components. Because propagation characteristics of electromagnetic waves vary with different frequencies, channel responses of signals are different as frequencies change, and are represented by changes of amplitudes and phases. This is the frequency selectivity. When a difference between arrival time of the last recognizable delay signal and arrival time of the 1st delay signal is larger, the delay spread is larger, the changes of the amplitudes and the phases of the channel responses are more intense, and the frequency selectivity is stronger.

11. Coordinated Multi-Point Transmission Technology (Coordinated Multi-Point, COMP)

The coordinated multi-point transmission technology CoMP resolves a problem of inter-cell interference by using a multi-cell MIMO technology. A basic idea of the coordinated multi-point transmission technology is to implement signal transmission by using a characteristic of a spatial channel. The CoMP technology is a multi-point transmission/reception technology. Multi-point herein means a plurality of geographically separated antenna access points, and may be used as a cell, a base station, a NodeB, an eNB, a distributed antenna, or the like. The CoMP technology uses antenna nodes connected by an optical fiber to coordinate to serve a user, and several adjacent antenna nodes simultaneously serve the user, to form a coordinated multi-station scenario. This may improve a data rate of the user. According to different transmission schemes, CoMP technologies may be classified into two types: a joint processing technology, and a coordinated scheduling and a beamforming technology. In the joint processing technology (JP-COMP), transmission points in a coordinated cell set share, on a same time-frequency resource, data used for transmission by a specific terminal device. The radio access network device may select, based on a scheduling result and a service requirement, all or some cells in the coordinated cell set to serve the terminal device. In a JP scheme, all cells in the coordinated cell set send same or different data to the terminal device in a same radio resource block, that is, a plurality of coordinated cells send data to a same terminal device at a same moment. This type of JP is referred to as a manner of joint transmission (JT). There are two manners of joint transmission (JT): coherent joint transmission (CJT) and non-coherent joint transmission (NCJT).

In a TDD system, because an uplink channel and a downlink channel use same bandwidth and have reciprocity, the radio access network device may obtain CSI of the downlink channel through the uplink channel by using the reciprocity between the uplink channel and the downlink channel, to perform signal precoding. In an FDD system, a spacing between uplink and downlink frequency bands is much greater than coherent bandwidth, and therefore there is no complete reciprocity between the uplink channel and the downlink channel, and accurate downlink precoding cannot be directly performed by using information about the uplink channel. In a conventional FDD system, the radio access network device performs downlink precoding based on CSI fed back by the terminal device to the network device. When the NCJT transmission manner is used, each transmission node participating in COMP uses an independent precoding scheme, and bit-level combination is implemented when the receive end receives the signal. When the CJT transmission manner is used, joint precoding needs to be performed on all transmission nodes participating in COMP. Therefore, the terminal device may consider all the transmission nodes as a whole, jointly measure channel information of all points, and feed back the channel information to the radio access network device, to determine precoding used to transmit downlink data.

Figure 2:
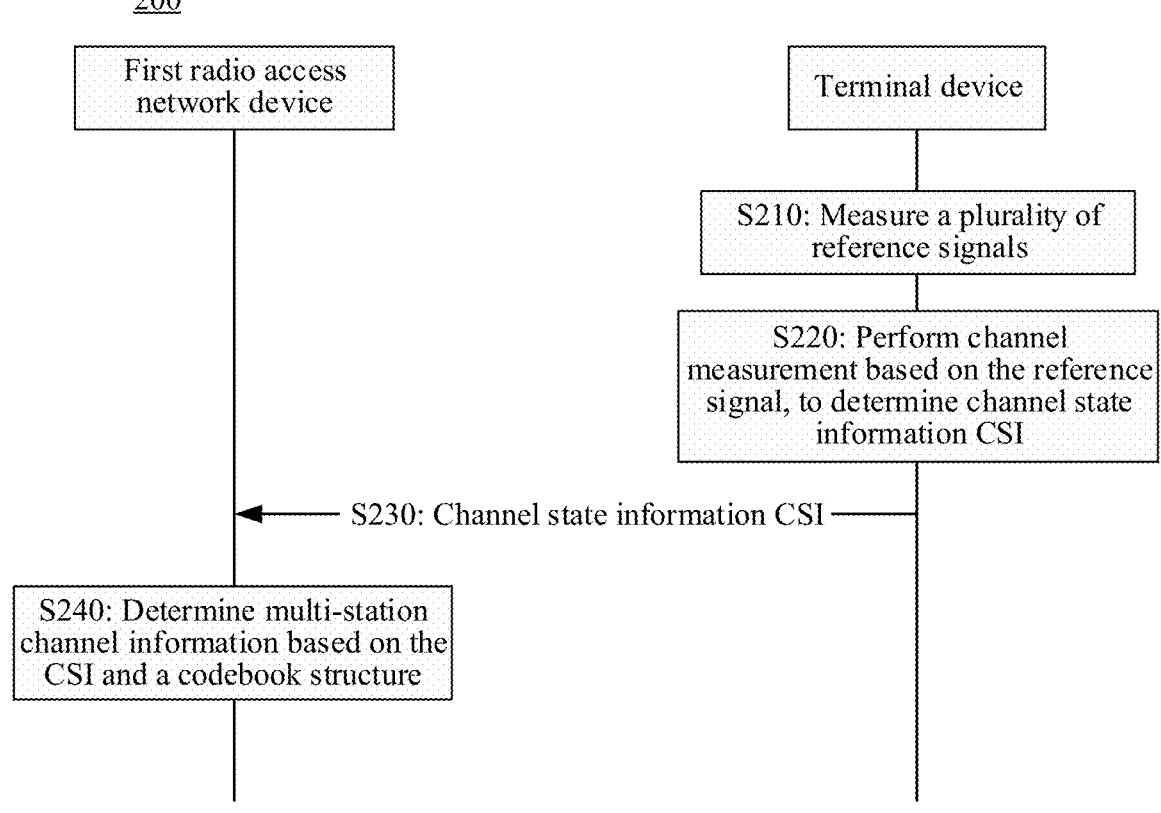
FIG. 2 is a schematic flowchart of determining a precoding matrix of a downlink channel.

FIG. 2 is a schematic flowchart of determining a precoding matrix of a downlink channel. The method 200 is performed by a radio access network device and a terminal device through interaction, and may specifically include step S210 to step S240.

S210: The terminal device measures a plurality of reference signals.

Specifically; each of a plurality of radio access network devices may send a reference signal to the terminal device. In this way, the terminal device may receive a plurality of reference signals. The plurality of reference signals are in one-to-one correspondence with the plurality of radio access network devices, and one of the plurality of radio access network devices sends one of the plurality of reference signals.

Optionally, the plurality of radio access network devices form a coordinating set. In other words, the plurality of radio access network devices may implement multi-station coordination, and jointly provide services for the terminal device. The plurality of radio access network devices may use CJT, or may use NCJT. This is not limited in this application.

The plurality of reference signals may be used for channel measurement. Specifically; the terminal device may measure a channel of each of the plurality of radio access network devices based on the plurality of reference signals, and separately obtain information about respective channels from the corresponding terminal device to the plurality of radio access network devices.

Optionally, when measuring the channel of each of the plurality of radio access network devices, the terminal device may jointly measure channels of the plurality of radio access network devices, or may separately measure the channel of each radio access network device. This is not limited in this application.

Optionally, the reference signal may be a CSI-RS. The plurality of radio access network devices may send CSI-RSs on different resources, or may send CSI-RSs on a same resource but different CSI-RS ports.

S220: The terminal device performs channel measurement based on the reference signal, to determine CSI.

Optionally, when the plurality of radio access network devices separately send reference signals to the terminal device, the terminal device may jointly measure the channels from the terminal device to the radio access network devices based on the plurality of received reference signals, to obtain the CSI. The channel state information may indicate a channel state of each of the plurality of radio access network devices.

For example, the terminal device may measure the channels of the plurality of radio access network devices by using the reference signals, first obtain multi-station channel information, and then determine, by using a codebook structure and the multi-station channel information, a PMI for indicating the multi-station channel information. The codebook structure may be predefined, for example, predefined in a 3GPP communication protocol. Herein, the multi-station channel information includes information about the channel from each of the plurality of radio access network devices to the terminal device.

It should be understood that, that the PMI for indicating the multi-station channel information is determined based on the multi-station channel information may be specified in the 3GPP communication protocol. For example, a corresponding algorithm may be specified in the 3GPP communication protocol to implement obtaining of the PMI for indicating the multi-station channel information. This is not limited in this application. Herein, obtaining of the PMI for indicating the multi-station channel information means that the terminal device separately obtains a PMI component corresponding to the information about the channel from each of the plurality of radio access network devices to the terminal device. In other words, the PMI for indicating the multi-station channel information may comprehensively reflect PMI components of the plurality of radio access network devices, and the PMIs of the plurality of radio access network devices correspond to the information about the channel from each of the plurality of radio access network devices to the terminal device.

Optionally, the CSI may include a PMI for indicating a precoding matrix or a channel matrix, and may further include an RI, a CQI, and the like.

S230: The terminal device reports the CSI.

In this step, the terminal device may send the CSI to each of the plurality of radio access network devices. Alternatively, the terminal device may send the CSI to one of the plurality of radio access network devices. If another radio access network device also needs to obtain the information, a first radio access network device may forward the CSI to the another radio access network device. Alternatively, the terminal device may send the CSI to a radio access network device outside the coordinating set. If the radio access network device in the coordinating set needs to obtain the information, the radio access network device outside the coordinating set may forward the CSI to the radio access network device in the coordinating set.

Therefore, the first radio access network device shown in FIG. 2 may be any one of the plurality of radio access network devices that form the coordinating set of the terminal device, or may be a radio access network device other than the plurality of radio access network devices that form the coordinating set of the terminal device. In other words, the first radio access network device may send the reference signal to the terminal device, or may not send the reference signal to the terminal device. This is not limited in this embodiment of this application.

It should be understood that the CSI may be carried on a physical uplink resource to be transmitted to the radio access network device. The physical uplink resource may be, for example, a physical uplink control channel (PUCCH) resource or a physical uplink shared channel (PUSCH) resource. This is not limited in this application.

It should be understood that the CSI may include the PMI for indicating the precoding matrix or the channel matrix, and may further include the RI, the CQI, and the like.

It should be further understood that, for a specific process in which the terminal device sends the CSI to the radio access network device, refer to the conventional technology. For brevity, detailed descriptions of the specific process are omitted herein.

S240: The first radio access network device determines the multi-station channel information based on the CSI reported by the terminal device and the codebook structure.

In this step, the first radio access network device may be any one of the plurality of radio access network devices that form the coordinating set of the terminal device, or may be the radio access network device other than the plurality of radio access network devices that form the coordinating set of the terminal device. In other words, the first radio access network device may send the reference signal to the terminal device, or may not send the reference signal to the terminal device. This is not limited in this embodiment of this application.

It should be understood that information in the CSI reported by the terminal device corresponds to parameter information in the codebook structure. For example, the CSI includes a specific value of a parameter in the codebook structure. In this way, the first radio access network device may obtain the multi-station channel information through calculation based on the CSI reported by the terminal device and the selected codebook structure, and determine, based on the multi-station channel information, the precoding matrix for transmitting data by the radio access network device, to send the data to the terminal device.

It should be understood that calculation processes vary with different selected codebook structures. For a specific calculation process, refer to the conventional technology. For brevity, detailed descriptions of the specific process are omitted herein.

It should be understood that, for the specific process of determining the precoding matrix and transmitting the data, refer to the conventional technology. For brevity, detailed descriptions of the specific process are omitted herein.

According to the foregoing method 200, after determining the precoding matrix of the downlink channel, the radio access network device may perform data transmission on the corresponding channel by using the precoding matrix. However, in a coordinated multi-station scenario, when a frequency domain feedback granularity of the PMI is large, a multi-station channel delay spread causes stronger channel frequency selectivity, and consequently channel information feedback precision is not high. As a result, a matching degree between the precoding matrix determined by using the method 200 and a real channel is not high. This affects data transmission quality.

For example, when the plurality of radio access network devices send reference signals to a same terminal device, time at which the reference signals arrive at the terminal device is different. As a result, there is an air interface delay difference between the plurality of radio access network devices. The air interface delay difference between the plurality of radio access network devices may be understood as an air interface delay difference between reference signals that are of different radio access network devices and that are transmitted to the terminal device. For example, if time required for transmitting a reference signal of the first radio access network device to the terminal device is t1, and time required for transmitting a reference signal of a second radio access network device to the terminal device is t2, there is an air interface delay difference between the first radio access network device and the second radio access network device, and the difference is t1−t2. The air interface delay difference between the plurality of radio access network devices causes a delay spread. A more definite delay spread indicates larger changes of amplitudes and phases of channels on different frequency components, and stronger selectivity of the different frequency components, namely, stronger frequency selectivity. Stronger frequency selectivity results in a greater PMI feedback channel precision loss, and consequently the precoding matrix determined based on the PMI is less accurate. The matching degree between the precoding matrix and the channel affects the signal transmission quality, and further affects effect of multi-station coordination and system performance.

Therefore, the channel information reporting method needs to be provided, to improve PMI feedback precision, and improve accuracy of the precoding matrix of the downlink channel, and enable more effective multi-station coordination.

FIG. 3 is a schematic flowchart of a channel information reporting method according to an embodiment of this application. The method 300 shown in FIG. 3 may be performed by a radio access network device and a terminal device through interaction. For example, the radio access network device may be the radio access network device 110, 120, or 130 in the communication system 100 shown in FIG. 1, and the terminal device may be the terminal device 140 in the communication system 100 shown in FIG. 1. The method 300 includes step S310 to step S360.

S310: The terminal device measures a plurality of reference signals.

For this step, refer to S210. Details are not described herein again.

S320: The terminal device determines first delay information and first channel information based on the plurality of received reference signals.

The first delay information includes delay information of a part of or all radio access network devices in a plurality of radio access network devices. Delay information of one radio access network device may be understood as delay information of a propagation delay, of a reference signal from the radio access network device to the terminal device, relative to a propagation delay of a first reference signal. The propagation delay of the first reference signal may be understood as time at which the first reference signal is transmitted from another radio access network device that sends the reference signal to the terminal device through an air interface.

The first channel information includes channel information of each of the plurality of radio access network devices. The channel information of the radio access network device may be understood as information about a radio channel from one radio access network device to the terminal device. The first channel information may be obtained by the terminal device by measuring the plurality of received reference signals. For a specific manner of measuring the reference signals to obtain the first channel information, refer to an existing solution. This is not specifically limited in this embodiment of this application.

In some embodiments, the first delay information may be determined based on an air interface delay of the reference signal. In this application, it is considered that there is a time difference between sending a signal by the radio access network device and receiving a signal by the terminal device, and time at which the signals arrive at the terminal device through different paths is different. The air interface delay may be time at which a first path of the reference signal sent by the radio access network device arrives at the terminal device or time at which a main path of the reference signal sent by the radio access network device arrives at the terminal device. In a narrow sense, the air interface delay may include only an air interface path propagation delay; or in a broad sense, the air interface delay may include both a hardware channel delay and an air interface path propagation delay.

The air interface delay difference is a time difference between arrival of the first path or the main path at the terminal device when two or more radio access network devices simultaneously send signals, namely, a difference between air interface delays of the two or more radio access network devices. For further descriptions, in consideration of the air interface delay in a narrow sense, the air interface delay difference is an air interface path propagation delay difference between radio access network devices; or in consideration of the air interface delay in a broad sense, the air interface delay difference includes an air interface path propagation delay difference between radio access network devices and a hardware channel delay difference at a transmit end.

For example, the terminal device may measure an air interface delay of a part of or all reference signals in the plurality of reference signals relative to the first reference signal, to obtain air interface delay differences of the plurality of reference signals, and then determine the first delay information based on the air interface delay differences of the plurality of reference signals.

Optionally, the air interface delay differences of the plurality of reference signals may include the air interface delay difference of the part of or all the reference signals in the plurality of reference signals relative to the first reference signal.

In an embodiment, the air interface delay differences of the plurality of reference signals may include a delay difference between a main path of the part of or all the reference signals in the plurality of reference signals and a main path of the first reference signal.

In another embodiment, the air interface delay differences of the plurality of reference signals may include a delay difference between a first path of the part of or all the reference signals in the plurality of reference signals and a first path of the first reference signal.

In this embodiment of this application, the first reference signal may be any one of the plurality of reference signals. It may be understood that a value of the air interface delay difference may be a positive number, or may be a negative number.

In an example, when the air interface delay difference is the positive number, the value of the air interface delay difference may be directly reported. When the air interface delay difference is the negative number, corresponding signaling is required to indicate that the air interface delay difference is the negative number. For example, 1 bit may be used to indicate that the air interface delay difference is the negative number.

In an example, the reported air interface delay difference may directly indicate, by using 1 bit, whether the air interface delay difference is the positive number or the negative number. For example, different values may be used to indicate positive and negative air interface delay differences. A reported value 1 indicates that the air interface delay difference is the positive number, and a reported value 0 indicates that the air interface delay difference is the negative number.

In an example, when the air interface delay difference is reported, different fields may be used to carry the positive air interface delay difference and the negative air interface delay difference. For example, the positive air interface delay difference may be reported in a same field, and the negative air interface delay difference may be reported in another field.

It should be noted that the positive air interface delay difference and the negative air interface delay difference may alternatively be indicated by using another method. This is not limited herein in this application.

For example, the first reference signal may be the 1st reference signal received by the terminal device in the plurality of reference signals.

For another example, the first reference signal may be a reference signal with the largest identifier in the plurality of reference signals or a reference signal with the smallest identifier in the plurality of reference signals. Specifically, each reference signal may have an identifier, for example, a CSI-RS identifier. The terminal device may sort reference signals based on identifiers of the reference signals, and determine the first reference signal from the reference signals.

It should be noted that the first reference signal may alternatively be determined in another manner. This is not limited in this application.

In this embodiment of this application, the terminal device determines the first delay information based on the air interface delay differences of the plurality of reference signals in a plurality of manners.

In an example, the terminal device may use the air interface delay differences of the plurality of reference signals as the first delay information. In other words, the first delay information may include the air interface delay differences of the plurality of reference signals.

In another example, the terminal device may determine the first delay information based on the air interface delay differences of the plurality of reference signals and a first mapping table. The first mapping table indicates a mapping relationship between an air interface delay difference range of a reference signal and a preset delay offset of a radio access network device, and the first delay information indicates a delay offset of the part of or all the radio access network devices in the plurality of radio access network devices corresponding to the plurality of reference signals.

In other words, the first mapping table may indicate the mapping relationship between "an air interface delay difference range and a delay offset". Specifically, the plurality of air interface delay differences may correspond to a same delay offset. The terminal device may obtain, based on the obtained air interface delay differences of the plurality of reference signals and the first mapping table, a delay offset corresponding to each radio access network device, and use the delay offset as the first delay information.

Actually, both the air interface delay difference and the delay offset indicate delay differences of different signals. The air interface delay difference is determined by measuring receiving time through an air interface, and truly reflects the delay differences of the signals. The delay offset may be understood as an approximate or estimated air interface delay.

In this embodiment of this application, the first mapping table may be predefined, for example, predefined in a 3GPP communication protocol, or customized by the terminal device, or customized by the radio access network device and then sent to the terminal device. This is not limited in this application.

Optionally, the first mapping table may include an index of each preset delay offset. Therefore, the first delay information may include a plurality of index values, and the plurality of index values are in one-to-one correspondence with delay offsets of the plurality of radio access network devices.

In this way, the terminal device only needs to report an index value corresponding to the delay offset of each radio access network device, and does not need to report a specific value of the delay offset, so that signaling overheads can be reduced.

Certainly, in another embodiment, if delay offsets of at least two radio access network devices in the plurality of radio access network devices are the same, the terminal device may also report only one index value, and the index value indicates the delay offsets of the at least two radio access network devices.

It should be noted that, in a solution in which the index value indicates the delay offset of the radio access network device, the radio access network device also needs to learn of the first mapping table, to keep consistent with understanding of the delay offset by the terminal device.

For ease of understanding, Table 1 shows a form of the first mapping table. The first mapping table may include an index, an air interface delay difference range, and a preset delay offset. It should be understood that Table 1 is merely an example for description, and should not constitute any limitation on this application. The first mapping table may further include other content or have another representation form.

TABLE 1

| Index | Air interface delay difference range | Delay offset |
|---|---|---|
| Index 1 | [0, T1) | t1 |
| Index 2 | [T1, T2) | t2 |
| Index 3 | [T2, T3) | t3 |
| . . . | . . . | . . . |

Refer to Table 1. For example, if it is determined that an air interface delay difference of a second reference signal relative to the first reference signal falls within a range of [T1, T2), it may be determined, according to Table 1, that a delay offset of the second reference signal relative to the first reference signal is t2, and an index corresponding to the delay offset is Index2, the terminal device may directly report the index Index2, to indicate a delay offset of a radio access network device corresponding to the second reference signal.

For another example, if it is determined that an air interface delay difference of a third reference signal relative to the first reference signal falls within a range of [T2, T3), it may be determined, according to Table 1, that a delay offset of the third reference signal relative to the first reference signal is t3, and an index corresponding to the delay offset is Index3, the terminal device may directly report the index Index3, to indicate a delay offset of a radio access network device corresponding to the third reference signal.

In an example, for example, there are three radio access network devices that send reference signals to the terminal device, and the reference signals received by the terminal device may include the first reference signal, the second reference signal, and the third reference signal. If the first reference signal is used as a standard, the terminal device may determine, based on the first mapping table shown in Table 1, that the delay offset corresponding to the air interface delay difference of the first reference signal is 0, the delay offset corresponding to the air interface delay difference of the second reference signal is t2, and the delay offset corresponding to the air interface delay difference of the third reference signal is t3. The first delay information determined by the terminal device may include the index Index1 corresponding to the delay offset t1 (that is, the delay offset indicated by the index Index1 is t1), the index Index2 corresponding to the delay offset t2, and the index Index3 corresponding to the delay offset t3.

In another example, for example, three radio access network devices send reference signals to the terminal device, and the reference signals received by the terminal device may include the first reference signal, the second reference signal, and the third reference signal. If the first reference signal is used as a standard, the terminal device may determine, based on the first mapping table shown in Table 1, that the delay offset corresponding to the air interface delay difference of the second reference signal is t2, and the delay offset corresponding to the air interface delay difference of the third reference signal is t3. The first delay information determined by the terminal device may be the index Index2 corresponding to the delay offset t2 and the index Index3 corresponding to the delay offset t3. In addition, the terminal device may report one piece of indication information to indicate that the first reference signal is a standard reference signal, or the terminal device may directly report that the delay offset of the first reference signal is 0, so that the first radio access network device determines the first reference signal as the standard reference signal.

It should be understood that, in this application, the first radio access network device may alternatively determine, in another manner, a specific reference signal that is used by the terminal device as a standard. This is not limited in this application.

After the terminal device reports the first delay information to the radio access network device, the radio access network device may determine the delay offset of each of the plurality of radio access network devices based on the first mapping table and the index value included in the first delay information.

In conclusion, the first delay information determined by the terminal device may include the air interface delay differences of the plurality of reference signals, or may include the delay offsets of the plurality of radio access network devices, or may include the plurality of index values corresponding to the delay offsets of the plurality of radio access network devices. This is not limited in this application.

S330: The terminal device performs delay difference compensation on the first channel information based on the first delay information, to determine second channel information.

In this embodiment of this application, the first channel information represents a real channel, and the second channel information represents a channel obtained after delay difference compensation is performed. In other words, the second channel information is obtained by performing delay difference compensation on the first channel information by using the first delay information.

Optionally, the first channel information and the second channel information may be in a channel matrix form.

There are a plurality of manners in which the terminal device performs delay difference compensation on the first channel information.

In an example, the terminal device may perform linear phase compensation on the first channel information in frequency domain based on the first delay information, so that main paths or first paths of channel information of the plurality of radio access network devices are aligned, to obtain the second channel information. In other words, the main paths of the channels represented by the second channel information are aligned, or the first paths are aligned.

In another example, the terminal device may perform linear phase compensation on the first channel information in frequency domain based on the first delay information, so that delay differences of the main paths of the channel information of the plurality of radio access network devices fall within a preset error range or delay differences of the first paths fall within the preset error range, to obtain the second channel information. In other words, the main path or the first path of the second channel information falls within the preset error range.

In still another example, the terminal device may perform multi-path component relocation on the first channel information in time domain based on the first delay information, so that the main paths or the first paths of the channel information of the plurality of radio access network devices are aligned, to obtain the second channel information.

In yet another example, the terminal device may perform multi-path component relocation on the first channel information in time domain based on the first delay information, so that delay differences of the main paths of the channel information of the plurality of radio access network devices fall within a preset error range or delay differences of the first paths fall within the preset error range.

After the terminal device performs delay difference compensation on the first channel information based on the first delay information, it may be ensured that the delay differences of the main paths of the channel information of the plurality of radio access network devices fall within a preset error range or the delay differences of the aligned first paths fall within the preset error range, so that second channel information with a small delay spread can be obtained. In this way, when the second channel information is fed back by using a PMI, PMI feedback precision is improved.

In particular, when the main paths or the first paths of the channel information of the plurality of radio access network devices are aligned by performing delay difference compensation on the first channel information, second channel information with a minimum delay spread can be obtained. A smaller delay spread indicates smaller impact of channel differences of different radio access network devices on amplitudes and phases of different frequency components, and weaker selectivity of different frequency components, so that frequency selectivity can be reduced to a large extent, a PMI feedback channel precision loss can be reduced, and PMI feedback precision can be improved.

S340: The terminal device determines the PMI based on the second channel information.

The PMI indicates the second channel information obtained in step S330.

Optionally, the PMI includes one PMI, and the PMI corresponds to the plurality of radio access network devices. In other words, the PMI indicates a channel state of each of the plurality of radio access network devices, or the PMI indicates a comprehensive channel state of the plurality of radio access network devices.

The terminal device may determine, based on the second channel information and a first codebook structure, the PMI for indicating the second channel information.

It should be understood that a specific calculation process of determining, based on the second channel information, the PMI for indicating the second channel information may be implemented by using an existing method, or may be prespecified in a 3GPP communication protocol. For example, a corresponding algorithm may be specified in the 3GPP communication protocol to obtain the PMI of the second channel information. This is not limited in this application.

The first codebook structure is not limited in this embodiment of this application. The first codebook structure may be an existing codebook structure (for example, an existing multi-station joint codebook structure), or may be a newly designed codebook structure, provided that the first codebook structure can be used to determine the PMI for indicating the second channel information.

S350: The terminal device reports the first delay information and the PMI.

As described in the foregoing content, the PMI indicates the second channel information. The first delay information and the PMI are used to determine a first precoding matrix, and the first precoding matrix matches the first channel information.

In this step, the terminal device may send the first delay information and the PMI to each of the plurality of radio access network devices. Alternatively, the terminal device may send the first delay information and the PMI to one of the plurality of radio access network devices. If another radio access network device also needs to obtain the information, the first radio access network device may forward the first delay information and the PMI to the another radio access network device. Alternatively, the terminal device may send the first delay information and the PMI to a radio access network device other than the plurality of radio access network devices that form the coordinating set of the terminal device. If the radio access network device in the coordinating set needs to obtain the information, the radio access network device outside the coordinating set may forward the first delay information and the PMI to the radio access network device in the coordinating set.

Therefore, the first radio access network device shown in FIG. 3 may be one of the plurality of radio access network devices that form the coordinating set of the terminal device, or may be the radio access network device outside the coordinating set. In other words, the first radio access network device may send the reference signal to the terminal device, or may not send the reference signal to the terminal device. This is not limited in this embodiment of this application.

It should be understood that the first delay information reported by the terminal device includes the delay information of the part of or all the radio access network devices in the plurality of radio access network devices. Delay information of one of the radio access network devices is used as an example. The terminal device may determine that there is a correspondence between the delay information and the reference signal. Therefore, when receiving the delay information, the first radio access network device may determine a correspondence between the delay information and the radio access network device based on the correspondence between the delay information and the reference signal and a correspondence between the reference signal and the radio access network device.

Optionally, the first delay information and the PMI that are reported by the terminal device may be carried on a physical uplink resource. The physical uplink resource may be, for example, a PUCCH resource or a PUSCH resource. This is not limited in this application.

In this step, the terminal device may report the first delay information and the PMI together, or may separately report the first delay information and the PMI. This is not specifically limited in this embodiment of this application.

For a specific process in which the terminal device sends the PMI to the radio access network device, refer to the conventional technology. For brevity, detailed descriptions of the specific process are omitted herein.

S360: The first radio access network device determines the first precoding matrix based on the first delay information and the PMI.

The first precoding matrix matches the first channel information. In other words, the radio access network device needs to obtain a precoding matrix that matches a real channel.

The radio access network device determines the first precoding matrix in a plurality of manners.

In an example, the first radio access network device may first obtain the first channel information, and then obtain the first precoding matrix that matches the first channel information.

That is, the first radio access network device first obtains original channel information, and then determines, based on the original channel information, a precoding matrix that matches the original channel information.

For example, the first radio access network device may obtain the first channel information based on the first delay information, the PMI, the first codebook structure, and the second codebook structure, and then obtain the first precoding matrix based on the first channel information.

For example, the first radio access network device obtains the second channel information based on the PMI and the first codebook structure, then obtains the first channel information based on the first delay information, the second channel information, and the second codebook structure, and then obtains the first precoding matrix based on the first channel information.

Figure 4:
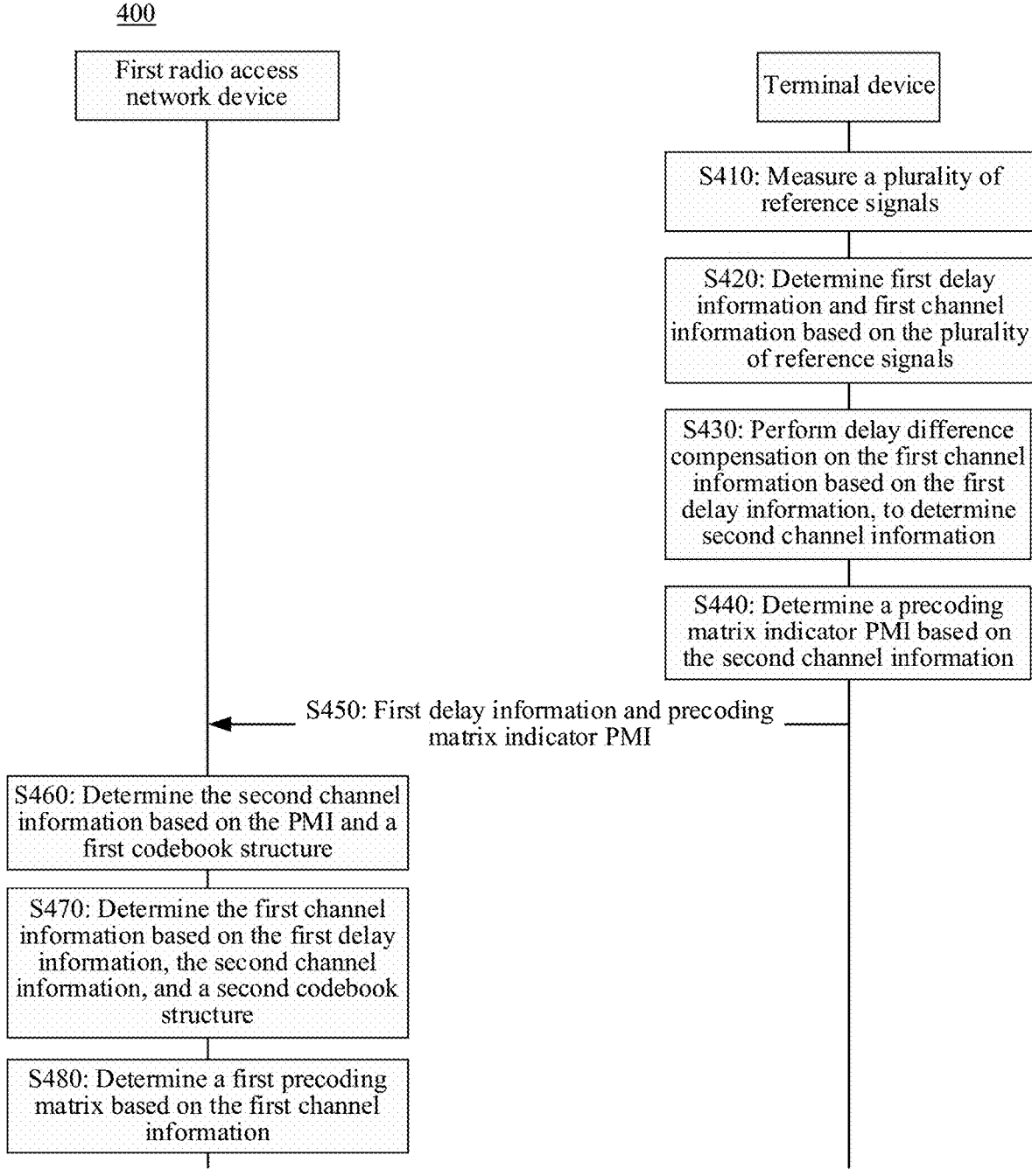
FIG. 4 is a schematic flowchart of another channel information reporting method according to this application.

For this example, the following provides detailed descriptions with reference to FIG. 4. Details are not described herein.

In another example, the first radio access network device may first obtain a second precoding matrix that matches the second channel information, and then obtain, based on the second precoding matrix, the first precoding matrix that matches the first channel information.

To be specific, the first radio access network device first obtains the second precoding matrix that matches the channel information obtained after delay compensation is performed, and then obtains, based on the second precoding matrix, the first precoding matrix that matches the original channel information.

For example, the first radio access network device may obtain the second channel information based on the PMI and the first codebook structure, determine, based on the second channel information, the second precoding matrix that matches the second channel information, and then obtain the first precoding matrix based on the first delay information and the second precoding matrix.

For this example, the following provides detailed descriptions with reference to FIG. 7. Details are not described herein.

In this embodiment of this application, the first precoding matrix determined by the first radio access network device is a joint precoding matrix of the plurality of radio access network devices. To be specific, the first precoding matrix determined by the first radio access network device matches channels of the plurality of radio access network devices, and the first precoding matrix is used by the plurality of radio access network devices to separately send data.

If the first radio access network device is one of the plurality of radio access network devices in the coordinating set, the first radio access network device may determine, from the first precoding matrix, a precoding matrix that matches a channel of the first radio access network device, and send data based on the precoding matrix. In addition, the first radio access network device may further send a corresponding precoding matrix to another radio access network device based on the determined first precoding matrix, and send data based on the corresponding precoding matrix.

If the first radio access network device is a radio access network device other than the plurality of radio access network devices that form the coordinating set of the terminal device, the radio access network device may separately send a corresponding precoding matrix to each radio access network device in the coordinating set, and send data based on the corresponding precoding matrix.

In this embodiment of this application, the terminal device performs delay difference compensation on the first channel information by using the first delay information, so that second channel information with a small delay spread is obtained. A smaller delay spread indicates smaller impact of channel differences of different radio access network devices on amplitudes and phases of different frequency components, and weaker selectivity of different frequency components, so that selectivity of channels on different frequency components can be reduced, that is, frequency selectivity is reduced. In this way, when the second channel information is fed back by using the PMI, because changes of amplitudes and phases of channels of different radio access network devices indicated by the second channel information are small in frequency domain, a PMI feedback channel precision loss is small, and PMI feedback precision is high. Particularly, when the PMI feedback granularity is large, PMI feedback precision may be significantly improved according to the technical solution provided in this application. The PMI feedback precision is improved, so that a more accurate precoding matrix of the downlink channel can be obtained, and performance advantages of coordinated multi-station transmission can be fully utilized. In addition, the radio access network device obtains, based on the first delay information and the precoding matrix indicator PMI that are reported by the terminal device, the first precoding matrix that matches the first channel information, so that the precoding matrix that matches the real channel for transmitting data can be obtained, data transmission performance can be ensured, and performance advantages of coordinated multi-station transmission can be fully utilized.

FIG. 4 is a schematic flowchart of another channel information reporting method according to an embodiment of this application. The method 400 includes step S410 to step S480. Step S410 to step S450 are in one-to-one correspondence with step S310 to step S350 in the method 300. Only brief descriptions are provided herein. For specific content, refer to descriptions of related steps in the method 300. For brevity, details are not described herein again. In addition, step S460 to step S480 may be understood as an implementation of step S360 in the method 300, and may be performed by a first radio access network device. The first radio access network device is one of a plurality of radio access network devices. The first radio access network device is, for example, the radio access network device 110, 120, or 130 shown in FIG. 1.

S410: A terminal device measures a reference signal.

S420: The terminal device determines first delay information and first channel information based on a plurality of received reference signals.

S430: The terminal device performs delay difference compensation on the first channel information based on the first delay information, to determine second channel information.

S440: The terminal device determines a PMI based on the second channel information.

S450: The terminal device reports the first delay information and the PMI.

S460: The first radio access network device determines the second channel information based on the PMI and a first codebook structure.

The PMI indicates the second channel information, the second channel information is obtained by performing delay difference compensation on the first channel information by using the first delay information, and the first channel information is real channel information obtained by measuring the plurality of reference signals received by the terminal device.

This step is to determine channel information obtained after delay compensation is performed.

The first codebook structure may be an existing codebook structure, or may be a newly designed codebook structure. This is not limited in this application, provided that the first codebook structure can be used to determine the second channel information. For ease of understanding, the following describes the first codebook structure as an example with reference to FIG. 5 and FIG. 6.

Figures 5, 6:
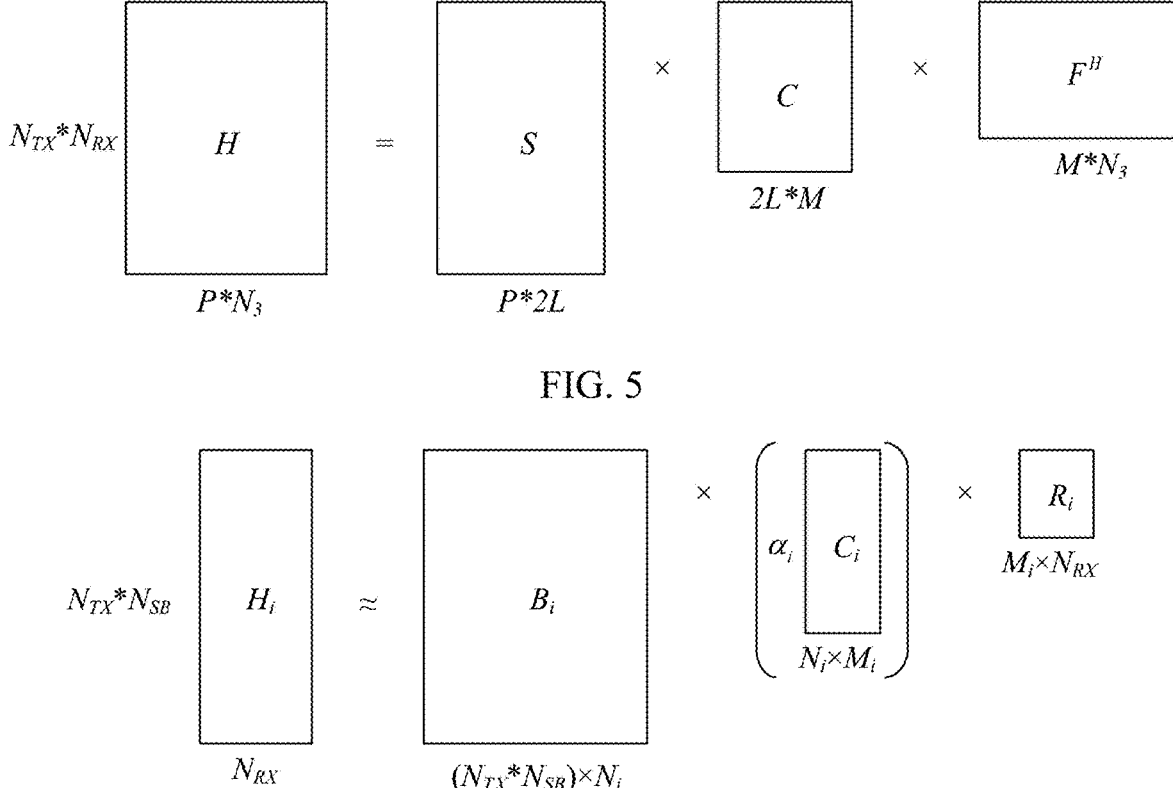
FIG. 5 is a diagram of a three-dimensional multi-station joint codebook structure in a coordinated multi-station scenario.
FIG. 6 is a diagram of a multi-station joint codebook structure applicable to a coordinated multi-station scenario.

FIG. 5 shows a three-dimensional multi-station joint codebook structure in a coordinated multi-station scenario. The codebook structure is applicable to a CJT transmission manner used between the plurality of radio access network devices. The terminal device needs to jointly measure information about channels between the terminal device and the radio access network devices, and feed back joint measurement results to the radio access network devices.

As shown in FIG. 5, in the codebook structure, H represents a channel between the radio access network device and the terminal device; S is a space domain beam, namely, a Kronecker product of several discrete Fourier transform (DFT) bases in a transmit end dimension or several DFT bases at a transmit end and a receive end; F is a frequency domain beam, namely, several DFT bases in a frequency domain sub-band dimension; and (is a superposition coefficient corresponding to a selected space domain beam and a selected frequency domain beam. H is a dimension of $P*N_i$, P is a product of a quantity $N_{TX}$ of measured CSI-RS ports and a quantity $N_{RX}$ of receive antenna ports, $N_3$ is a quantity of frequency domain units, $S_i$ is a selected space domain beam, L beams are selected in each polarization direction, $F_i$ is a selected frequency domain beam, and a total of M frequency domain beams are selected.

For example, information carried in CSI may include large-scale information a, a space domain beam S, a frequency domain beam F, and a superposition coefficient C corresponding to the selected space domain beam and the selected frequency domain beam. The radio access network device may determine multi-station channel information based on the information carried in the CSI and the codebook structure shown in FIG. 5.

For example, assuming that three radio access network devices simultaneously serve one terminal device, and a CJT transmission manner is used between the three radio access network devices, channel information of the three radio access network devices may be restored by using the codebook structure shown in FIG. 5, and channels $H_i$ from the terminal device to the three radio access network devices are shown in Formula (1):

$$\begin{bmatrix} H_1 \\ H_2 \\ H_3 \end{bmatrix} = \begin{bmatrix} \alpha_1 \tilde{H}_1 \\ \alpha_2 \tilde{H}_2 \\ \alpha_3 \tilde{H}_3 \end{bmatrix} \approx \begin{bmatrix} \alpha_1 S_1 C_1 F_1^H \\ \alpha_2 S_2 C_2 F_2^H \\ \alpha_3 S_3 C_3 F_3^H \end{bmatrix} = \qquad \text{(Formula 1)}$$

$$\begin{bmatrix} \alpha_1 & & \\ & \alpha_2 & \\ & & \alpha_3 \end{bmatrix} \begin{bmatrix} S_1 & & \\ & S_2 & \\ & & S_3 \end{bmatrix} \begin{bmatrix} C_1 & & \\ & C_2 & \\ & & C_3 \end{bmatrix} [F_1 \ F_2 \ F_3]^H$$

$H_i$ represents a channel from a radio access network device i to user equipment, and includes large-scale information and small-scale information, $\alpha_i$ is the large-scale information, and the small-scale information includes a space domain beam $S_i$, a frequency domain beam $F_i$, and a superposition coefficient $C_i$ corresponding to the selected space domain beam and the selected frequency domain beam.

FIG. 6 shows another multi-station joint codebook structure applicable to a coordinated multi-station scenario. The codebook structure is applicable to a CJT transmission manner used between a plurality of stations.

As shown in FIG. 6, in the codebook structure, $H_i$ represents a channel between the radio access network device and the terminal device, and a dimension of $H_i$ is $(N_{TX}*N_{SB}) \times N_{RX}$; $N_{TX}$ represents a quantity of measured CSI-RS ports; $N_{SB}$ represents a quantity of frequency domain units; $N_{RX}$ represents a quantity of receive antenna ports of the terminal device; $B_i$ is a frequency domain joint base at a transmit end, and includes $N_i$ basis vectors; $R_i$ is an independent base at a receive end, and includes $M_i$ basis vectors; and $\alpha_i C_i$ is a superposition coefficient including large-scale information.

During application, the terminal device may specify a space-frequency domain joint base at a transmit end based on space-frequency domain characteristic space of a downlink channel, report the space-frequency domain joint base at the transmit end by using a long CSI periodicity, and report the superposition coefficient by using a short CSI periodicity.

For example, information carried in CSI may include a frequency domain joint base B at a transmit end, an independent base R at a receive end, and a superposition coefficient αC of large-scale information. The radio access network device may determine multi-station channel information based on the information carried in the CSI and the codebook structure shown in FIG. 4.

For example, assuming that three radio access network devices simultaneously serve one terminal device, and a CJT transmission manner is used, when the codebook structure shown in FIG. 6 is used, channels $H_i$ between the terminal device and the three radio access network devices are shown in Formula (2):

$$\begin{bmatrix} H_1 \\ H_2 \\ H_3 \end{bmatrix} = \begin{bmatrix} \alpha_1 \tilde{H}_1 \\ \alpha_2 \tilde{H}_2 \\ \alpha_3 \tilde{H}_3 \end{bmatrix} \approx$$ (Formula 2)

$$\begin{bmatrix} \alpha_1 B_1 C_1 R_1 \\ \alpha_2 B_2 C_2 R_2 \\ \alpha_3 B_3 C_3 R_3 \end{bmatrix} = \begin{bmatrix} B_1 & & \\ & B_2 & \\ & & B_3 \end{bmatrix} \begin{bmatrix} \alpha_1 C_1 & & \\ & \alpha_2 C_2 & \\ & & \alpha_3 C_3 \end{bmatrix} \begin{bmatrix} R_1 \\ R_2 \\ R_3 \end{bmatrix}$$

It should be understood that the foregoing two codebook structures are applicable to the coordinated multi-station scenario. The information carried in the CSI is correspondingly different based on different selected codebook structures. The CSI may indicate a specific value of a parameter in the codebook structure.

It should be noted that the foregoing two codebook structures are merely examples for description, and cannot limit the scope of this application. In this application, the multi-station channel information may alternatively be determined by using another codebook structure applicable to the coordinated multi-station scenario. Details are not described herein.

In this embodiment of this application, the first codebook structure is used to restore, by using the PMI fed back by the terminal device, the channel information reported by the terminal device. In step S450, the PMI reported by the terminal device indicates the second channel information, namely, the channel information obtained after delay compensation is performed. Therefore, in this step, the first radio access network device obtains the second channel information through calculation by using the first codebook structure and the PMI.

In this step, for a specific process of calculating the second channel information by using the PMI and the first codebook structure, refer to the conventional technology. For brevity, detailed descriptions of the specific process are omitted herein.

S470: The first radio access network device determines the first channel information based on the second channel information, the first delay information, and a second codebook structure.

This step is to determine original (or real) channel information.

In this step, the first channel information determined by the first radio access network device is the same as or approximately the same as the first channel information determined by the terminal device in S420.

In this embodiment of this application, the second codebook structure is used to restore the second channel information to the first channel information. Alternatively, it may be understood as that the second codebook structure corresponds to an inverse process of the process performed by the terminal device in step S430. In other words, if in step S430, the terminal device performs delay difference compensation on the first channel information based on the first delay information, to obtain the second channel information, in step S470, the first radio access network device needs to perform delay difference inverse compensation (or referred to as an inverse process of delay difference compensation, an opposite process of delay difference compensation, or the like) on the second channel information based on the first delay information and by using the second codebook structure, to obtain the first channel information.

For example, if in step S430, the terminal device performs linear phase compensation on the first channel information in frequency domain by using the first delay information, to obtain the second channel information, in step S470, the first radio access network device may perform linear phase inverse compensation on the second channel information in frequency domain based on the second codebook structure and the first delay information, to obtain the first channel information.

In this embodiment of this application, the second codebook structure may be a newly designed codebook structure, and the second codebook structure may include a delay parameter. The first delay information may indicate a value of the delay parameter.

By way of an example but not a limitation, the second codebook structure may be shown in Formula 3. It should be understood that Formula 3 is merely an example, and should not constitute any limitation on this application:

$$\hat{H} = \begin{bmatrix} \hat{H}^1 \\ \hat{H}^2 \\ \vdots \\ \hat{H}^n \end{bmatrix} = \begin{bmatrix} \hat{H}^1 \odot W_1 \\ \hat{H}^2 \odot W_2 \\ \vdots \\ \hat{H}^n \odot W_N \end{bmatrix}, \quad W_n = \begin{bmatrix} e^{-j2\pi f_1 \tau_n} & \cdots & e^{-j2\pi f_{N_{SB}} \tau_x} \\ & \vdots & \\ e^{-j2\pi f_1 \tau_n} & \cdots & e^{-j2\pi f_{N_{SB}} \tau_x} \end{bmatrix} \in \mathbb{C}^{N_{Tx} \times N_{SB}}, \quad n = 1, \dots, N$$ (Formula 3)

$\check{H}$ is a real multi-station channel, $\hat{H}^n$ is a channel obtained after inverse compensation is performed, $\hat{H}^n$ is a channel obtained after compensation is performed, $\check{H}$, $\hat{H}^n$, and $\hat{H}^n$ are channel components corresponding to receive antenna ports of each terminal device, a dimension is $N_{TX} \times N_{SB}$, $N_{TX}$ represents a quantity of CSI-RS measurement ports, $N_{SB}$ represents a quantity of frequency domain units, $f_k$ represents a frequency of a $k^{th}$ frequency domain unit, and $\tau_n$ represents a delay offset of an $n^{th}$ radio access network device.

It should be noted that the real multi-station channel corresponds to the first channel information, and may specifically include a real channel of each of the plurality of radio access network devices. The channel obtained after inverse compensation is performed may be understood as a channel component of the real multi-station channel, and is the same as or similar to a real channel of a specific radio access network device. The channel obtained after compensation is performed may be understood as a channel component of the multi-station channel obtained after compensation is performed, and is specifically a channel, of a radio access network device, obtained after delay difference compensation is performed. A plurality of channels obtained after compensation is performed correspond to the second channel information, and may specifically include a channel, of each of the plurality of radio access network devices, obtained after delay difference compensation is performed.

In this embodiment of this application, the first codebook structure and the second codebook structure may be separately used. For example, the first codebook structure is first used, and then the second codebook structure is used. For example, step S460 is performed first, and then step S470 is performed. The second channel information may be separately output.

In some other embodiments, the first codebook structure and the second codebook structure may also be nested together for use. In other words, in term of a form, the first codebook structure and the second codebook structure are a general codebook structure. In this way, step S460 and step S470 may be synchronously performed, or may be combined into one step, to be specific, the first radio access network device obtains the first channel information based on the first delay information, the PMI, the first codebook structure, and the second codebook structure.

S480: The first radio access network device determines a precoding matrix based on the first channel information.

The first precoding matrix matches the first channel information, and the first precoding matrix may include precoding matrices of the plurality of radio access network devices. After obtaining the first precoding matrix, the first radio access network device may determine a to-be-used precoding matrix from the first precoding matrix, to precode to-be-transmitted data, to perform data transmission.

In this step, for a specific process of obtaining the first precoding matrix based on the first channel information, refer to the conventional technology. For brevity, detailed descriptions of the specific process are omitted herein.

In this embodiment of this application, the radio access network device restores the first channel information by using the first codebook structure and the second codebook structure and with reference to the first delay information and the PMI, to obtain more accurate real channel information before delay difference compensation. Correspondingly, the radio access network device may obtain the precoding matrix that can better match the real channel for transmitting data, so that data transmission performance can be ensured, and performance advantages of coordinated multi-station transmission can be fully utilized.

FIG. 7 is a schematic flowchart of still another channel information reporting method according to an embodiment of this application. The method 700 includes step S710 to step S780. Step S710 to step S750 are in one-to-one correspondence with step S310 to step S350 in the method 300. Only brief descriptions are provided herein. For specific content, refer to descriptions of related steps in the method 300. For brevity, details are not described herein again. In addition, step S760 to step S780 may be understood as an implementation of step S360 in the method 300, and may be performed by a first radio access network device. The first radio access network device is one of a plurality of radio access network devices. The first radio access network device is, for example, the radio access network device 110, 120, or 130 shown in FIG. 1.

S710: A terminal device measures a reference signal.

S720: The terminal device determines first delay information and first channel information based on a plurality of received reference signals.

S730: The terminal device performs delay difference compensation on the first channel information based on the first delay information, to determine second channel information.

S740: The terminal device determines a PMI based on the second channel information.

S750: The terminal device reports the first delay information and the PMI.

S760: The first radio access network device determines the second channel information based on the PMI and a first codebook structure.

This step is to determine channel information obtained after delay compensation is performed. Step S760 is the same as step S460 in the method 600. For details, refer to related descriptions of S460. For brevity, details are not described herein again.

S770: The first radio access network device determines a second precoding matrix based on the second channel information.

The second precoding matrix matches the second channel information.

This step is to determine a precoding matrix that matches channel information after compensation is performed.

In this step, for a specific process of obtaining the second precoding matrix based on the second channel information, refer to the conventional technology. For brevity, detailed descriptions of the specific process are omitted herein.

S780: The first radio access network device performs delay difference compensation on the second precoding matrix based on the first delay information, to obtain a first precoding matrix.

The first precoding matrix matches the first channel information.

This step is to determine a precoding matrix that matches original channel information.

In this step, delay difference compensation performed by the first radio access network device on the second precoding matrix based on the first delay information may be performed based on a corresponding precoding algorithm. A specific precoding algorithm is not limited herein, provided that precoding delay difference compensation effect can be achieved, and the first precoding matrix that matches the first channel information is obtained. The precoding algorithm includes a delay parameter, and the first delay information may indicate a value of the delay parameter. During specific implementation, if the terminal device performs linear phase compensation on the first channel information in frequency domain by using the first delay information, when delay difference compensation is performed on the second precoding matrix, the used precoding algorithm should be capable of restoring the parameter related to delay compensation in the second precoding matrix.

It should be further understood that a delay difference used when the first radio access network device performs delay difference compensation on the second precoding matrix based on the first delay information corresponds to the first delay information reported by the terminal device, to match the first channel information and ensure data transmission performance.

In this embodiment of this application, the radio access network device restores the second channel information by using the first codebook structure and the PMI, then determines the second precoding matrix that matches the second channel information, and finally directly performs delay difference compensation on the second precoding matrix based on the first delay information reported by the terminal device, to obtain the first precoding matrix that matches the first channel information. The radio access network device can obtain a precoding matrix that matches real channel without obtaining real channel information, so that data transmission performance can be ensured.

In some embodiments, this application further provides a channel information reporting method. The method includes:

The first radio access network device sends a fourth reference signal to the terminal device.

The first radio access network device receives the first delay information and the PMI that are sent by the terminal device.

The first delay information includes delay information of each of a part of or all radio access network devices in the plurality of radio access network devices.

The PMI indicates the second channel information, and the second channel information is obtained by performing delay difference compensation on the first channel information by using the first delay information. The first channel information is obtained by measuring the plurality of reference signals received by the terminal device, the plurality of reference signals are in one-to-one correspondence with the plurality of radio access network devices, and the plurality of reference signals include the fourth reference signal.

The first channel information includes channel information of each radio access network device in the plurality of radio access network devices.

The first delay information and the PMI are used to determine the first precoding matrix, and the first precoding matrix matches the first channel information.

Optionally, in the method, the first radio access network device may further perform step S360 in the method 300, steps S460 to S480 in the method S400, steps S760 to S780 in the method 700, and related optional embodiments of the steps. For details, refer to the foregoing related descriptions. For brevity, details are not described herein again.

The foregoing describes the method embodiments of embodiments of this application in detail with reference to FIG. 1 to FIG. 7. The following describes apparatus embodiments of embodiments of this application in detail with reference to FIG. 8 to FIG. 11. It should be understood that descriptions of the method embodiments correspond to descriptions of the apparatus embodiments. Therefore, for a part that is not described in detail, refer to the foregoing method embodiments.

Figure 8:
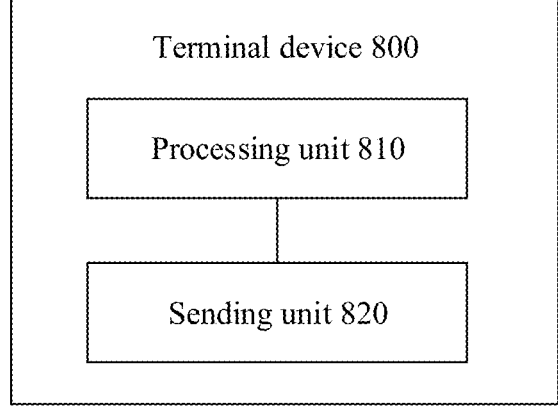
FIG. 8 is a diagram of a structure of a terminal device according to this application.

FIG. 8 is a diagram of a structure of a terminal device according to an embodiment of this application. The terminal device may be the terminal device mentioned above, for example, may be a specific example of the terminal device 140 shown in FIG. 1. The terminal device 800 includes a processing unit 810 and a sending unit 820.

The processing unit 810 is configured to:

measure a plurality of reference signals from a plurality of radio access network devices, where one of the plurality of radio access network devices sends one of the plurality of reference signals;

determine first delay information and first channel information based on the plurality of reference signals, where the first delay information includes delay information of a part of or all radio access network devices in the plurality of radio access network devices, and the first channel information includes channel information of each of the plurality of radio access network devices; and perform delay difference compensation on the first channel information based on the first delay information, to obtain second channel information, and determine a precoding matrix indicator PMI based on the second channel information, where the PMI indicates the second channel information.

The sending unit 820 is configured to report the first delay information and the PMI.

Optionally, the processing unit 810 is specifically configured to: measure an air interface delay of a part of or all reference signals in the plurality of reference signals relative to a first reference signal, and obtain an air interface delay difference of the part of or all the reference signals, where the first reference signal is one of the plurality of reference signals; and determine the first delay information based on the air interface delay differences of the plurality of reference signals.

Optionally, the first delay information includes the air interface delay difference of the part of or all the reference signals.

Optionally, the processing unit 810 is specifically configured to determine the first delay information based on the air interface delay difference of the part of or all the reference signals and a first mapping table, where the first mapping table indicates a mapping relationship between an air interface delay difference range of a reference signal and a preset delay offset of a radio access network device, and the first delay information indicates a delay offset of each of the plurality of radio access network devices corresponding to the part or all reference signals.

Optionally, the first delay information includes a plurality of index values, and one of the plurality of index values indicates a delay offset of one of the part of or all the radio access network devices.

Optionally, the air interface delay difference of the part of or all the reference signals includes a delay difference of a main path, of each of the part of or all the reference signals, relative to a main path of the first reference signal; or the air interface delay difference of the part of or all the reference signals includes a delay difference of a first path, of each of the part of or all the reference signals, relative to a first path of the first reference signal.

Optionally, the first reference signal is the $1^{st}$ reference signal received by the receiving unit in the plurality of reference signals.

Optionally, the processing unit 810 is specifically configured to perform linear phase compensation on the first channel information in frequency domain based on the first delay information, so that main paths or first paths of channel information of the plurality of radio access network devices are aligned.

Figure 9:
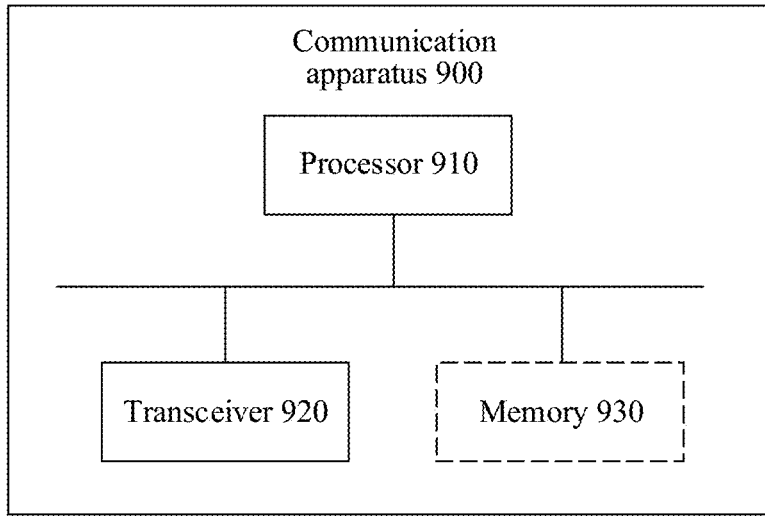
FIG. 9 is a diagram of a structure of a communication apparatus according to this application.

FIG. 9 is a block diagram of a structure of a communication apparatus 900 according to an embodiment of this application. The communication apparatus 900 may be the terminal device in FIG. 5, FIG. 6, or FIG. 7, and may be specifically a specific example of the terminal device 140 in FIG. 1. The communication apparatus 900 may be configured to implement the foregoing steps performed by the terminal device, for example, the method in FIG. 5, FIG. 6, or FIG. 7. To avoid redundancy, descriptions are not repeated.

The apparatus 900 may use a hardware architecture shown in FIG. 9. The apparatus may include a processor 910 and a transceiver 920. Optionally, the apparatus may further include a memory 930. The processor 910, the transceiver 920, and the memory 930 communicate with each other through an internal connection path. Related functions implemented by the processing unit 810 in FIG. 8 may be implemented by the processor 910, and related functions implemented by the sending unit 820 may be implemented by the processor 910 by controlling the transceiver 920.

Optionally, the processor 910 may be a general-purpose central processing unit (CPU), a microprocessor, an application-specific integrated circuit (ASIC), a dedicated processor, or one or more integrated circuits configured to perform the technical solutions in embodiments of this application. Alternatively, the processor may be one or more devices, circuits, and/or processing cores configured to process data (for example, computer program instructions). For example, the processor may be a baseband processor or a central processing unit. The baseband processor may be configured to process a communication protocol and communication data. The central processing unit may be configured to control a time domain resource configuration apparatus (for example, a radio access network device, a terminal device, or a chip), execute a software program, and process data of the software program.

Optionally, the processor 910 may include one or more processors, for example, include one or more central processing units (CPUs). When the processor is one CPU, the CPU may be a single-core CPU, or may be a multi-core CPU.

The transceiver 920 is configured to send data and/or a signal, and receive data and/or a signal. The transceiver may include a transmitter and a receiver. The transmitter is configured to and/or a signal, and the receiver is configured to receive data and/or a signal.

The memory 930 includes but is not limited to a random access memory (RAM), a read-only memory (ROM), an erasable programmable memory (EPROM), and a compact disc read-only memory (CD-ROM). The memory 930 is configured to store related instructions and related data.

The memory 930 is configured to store program code and data of the terminal device, and may be a separate device or integrated into the processor 910.

Specifically; the processor 910 is configured to control the transceiver to perform information transmission with a radio access network device. For details, refer to the descriptions in the foregoing method embodiments. Details are not described herein again.

It may be understood that FIG. 9 merely shows a simplified design of the communication apparatus 900. During actual application, the apparatus may further include other necessary components, including but not limited to any quantity of transceivers, processors, controllers, memories, and the like, and all terminal devices that can implement this application shall fall within the protection scope of this application.

In a possible design, the apparatus 900 may be a chip, for example, may be a communication chip that can be used in a terminal device, and configured to implement related functions of the processor 910 in the terminal device. The chip may be a field programmable gate array, a dedicated integrated chip, a system chip, a central processing unit, a network processor, a digital signal processing circuit, or a microcontroller that is for implementing related functions, or may be a programmable controller or another integrated chip. Optionally, the chip may include one or more memories, configured to store program code. When the code is executed, the processor is enabled to implement a corresponding function.

Figure 10:
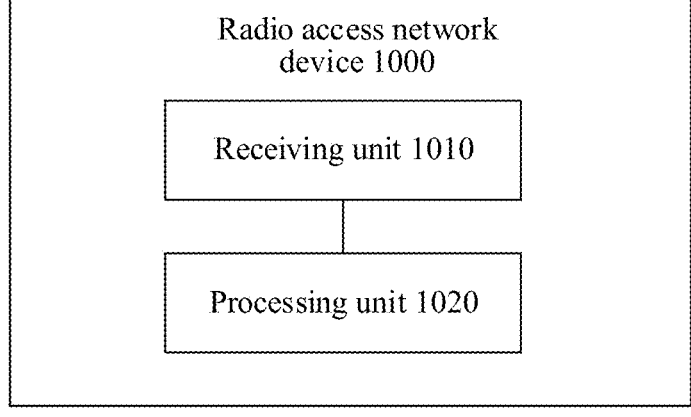
FIG. 10 is a diagram of a structure of a radio access network device according to this application.

FIG. 10 is a diagram of a structure of a radio access network device according to this application. The radio access network device may be the radio access network device mentioned above, for example, the first radio access network device, for example, may be a specific example of the radio access network device 110, 120, or 130 shown in FIG. 1. The radio access network device 1000 includes a receiving unit 1010 and a processing unit 1020.

The receiving unit 1010 is configured to receive first delay information and a precoding matrix indicator PMI that are sent by a terminal device.

The first delay information includes delay information of a part of or all radio access network devices in a plurality of radio access network devices, the PMI indicates second channel information, the second channel information is obtained by performing delay difference compensation on first channel information by using the first delay information, and the first channel information includes channel information of each of the plurality of radio access network devices.

The processing unit 1020 is configured to determine a first precoding matrix based on the first delay information and the PMI. The first precoding matrix matches the first channel information.

Optionally, the processing unit 1020 is specifically configured to: obtain the first channel information according to the first delay information, the PMI, a first codebook structure, and a second codebook structure; and obtain the first precoding matrix based on the first channel information.

Optionally, the processing unit 1020 is specifically configured to: obtain the second channel information based on the PMI and the first codebook structure; and obtain the first channel information based on the first delay information, the second channel information, and the second codebook structure.

Optionally, the second codebook structure includes a delay parameter, the first delay information indicates a value of the delay parameter, and the second channel information is obtained by performing linear phase compensation on the first channel information in frequency domain by using the first delay information. The processing unit 1020 is specifically configured to perform linear phase inverse compensation on the second channel information in frequency domain based on the second codebook structure and the value of the delay parameter, to obtain the first channel information.

Optionally, the processing unit 1020 is specifically configured to: obtain the second channel information based on the PMI and the first codebook structure; determine a second precoding matrix based on the second channel information, where the second precoding matrix matches the second channel information; and perform delay difference compensation on the second precoding matrix based on the first delay information, to obtain the first precoding matrix.

Optionally, the first delay information is determined based on an air interface delay difference of a part of or all reference signals in the plurality of reference signals received by the terminal device, and the air interface delay difference of the part of or all the reference signals is obtained by measuring an air interface delay of the part of or all the reference signals in the plurality of reference signals relative to a first reference signal.

Optionally, the first delay information includes the air interface delay difference of the part of or all the reference signals.

Optionally, the first delay information includes a plurality of index values, one of the plurality of index values indicates a delay offset of one of the part of or all the radio access network devices, and delay offsets of the plurality of radio access network devices are determined based on the air interface delay difference of the part of or all the reference signals and a first mapping table, where the first mapping table indicates a mapping relationship between an air interface delay difference range of a reference signal and a preset delay offset of a radio access network device.

Optionally, the air interface delay difference of the part of or all the reference signals includes a delay difference of a main path, of each of the part of or all the reference signals, relative to a main path of the first reference signal; or the air interface delay difference of the part of or all the reference signals includes a delay difference of a first path, of each of the part of or all the reference signals, relative to a first path of the first reference signal.

Optionally, the first reference signal is the $1^{st}$ reference signal received by the receiving unit 1010 in the plurality of reference signals.

Figure 11:
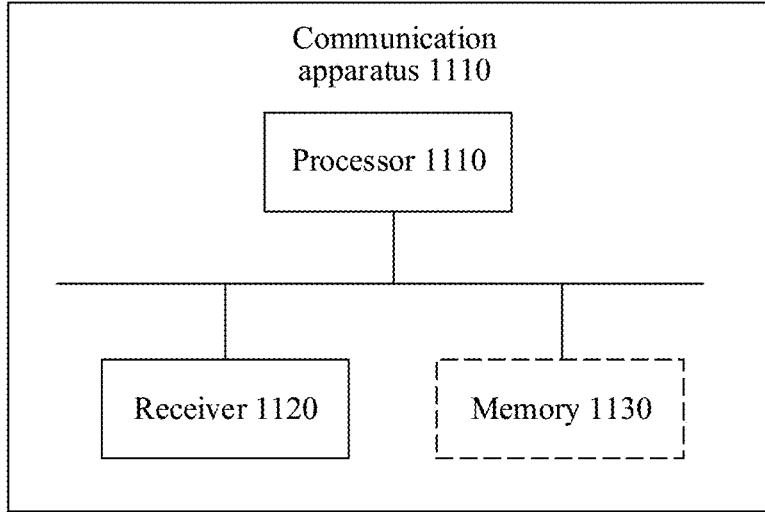
FIG. 11 is a diagram of a structure of another communication apparatus according to this application.

FIG. 11 is a block diagram of a structure of a communication apparatus 1100 according to an embodiment of this application. The communication apparatus 1100 may be the first radio access network device in FIG. 5, FIG. 6, or FIG. 7. The communication apparatus 1100 may be configured to implement the foregoing steps, for example, the method in FIG. 5, FIG. 6, or FIG. 7, performed by the radio access network device, for example, the first radio access network device. To avoid redundancy, descriptions are not repeated.

The apparatus 1100 may use a hardware architecture shown in FIG. 11. The apparatus may include a processor 1110 and a transceiver 1120. Optionally, the apparatus may further include a memory 1130. The processor 1110, the transceiver 1120, and the memory 1130 communicate with each other through an internal connection path. Related functions implemented by the processing unit 1020 in FIG. 10 may be implemented by the processor 1110, and related functions implemented by the receiving unit 1010 may be implemented by the processor 1110 by controlling the transceiver 1120.

Optionally, the processor 1110 may be a general-purpose central processing unit (CPU), a microprocessor, an application-specific integrated circuit (ASIC), a dedicated processor, or one or more integrated circuits configured to perform the technical solutions in embodiments of this application. Alternatively, the processor may be one or more devices, circuits, and/or processing cores configured to process data (for example, computer program instructions). For example, the processor may be a baseband processor or a central processing unit. The baseband processor may be configured to process a communication protocol and communication data. The central processing unit may be configured to control a time domain resource configuration apparatus (for example, a radio access network device, a terminal device, or a chip), execute a software program, and process data of the software program.

Optionally, the processor 1110 may include one or more processors, for example, include one or more central processing units (CPUs). When the processor is one CPU, the CPU may be a single-core CPU, or may be a multi-core CPU.

The transceiver 1120 is configured to send and receive data and/or a signal, and receive data and/or a signal. The transceiver may include a transmitter and a receiver. The transmitter is configured to send data and/or a signal, and the receiver is configured to receive data and/or a signal.

The memory 1130 includes but is not limited to a random access memory (RAM), a read-only memory (ROM), an erasable programmable memory (EPROM), and a compact disc read-only memory (CD-ROM). The memory 1130 is configured to store related instructions and related data.

The memory 1130 is configured to store program code and data of the radio access network device, and may be a separate device or integrated into the processor 1110.

For example, the processor 1110 is configured to control information transmission between the transceiver and the terminal device. For details, refer to the descriptions in the foregoing method embodiments. Details are not described herein again.

It may be understood that FIG. 11 merely shows a simplified design of the communication apparatus 1100.

During actual application, the apparatus may further include other necessary components, including but not limited to any quantity of transceivers, processors, controllers, memories, and the like, and all radio access network devices that can implement this application shall fall within the protection scope of this application.

In a possible design, the apparatus 1100 may be a chip, for example, may be a communication chip that can be used in the radio access network device, and is configured to implement related functions of the processor 1110 in the radio access network device. The chip may be a field programmable gate array, a dedicated integrated chip, a system chip, a central processing unit, a network processor, a digital signal processing circuit, or a microcontroller that is for implementing related functions, or may be a programmable controller or another integrated chip. Optionally, the chip may include one or more memories, configured to store program code. When the code is executed, the processor is enabled to implement a corresponding function.

In another form of this embodiment, a computer-readable storage medium is provided. The computer-readable storage medium stores instructions. When the instructions are executed, the methods of the terminal device and/or the radio access network device in the foregoing method embodiments are performed.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one place, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A channel information reporting method, comprising:
measuring, by a communication apparatus, a plurality of reference signals based on a plurality of reference signal resources;
determining, by the communication apparatus, first delay information and first channel information based on the plurality of reference signals, wherein the first delay information comprises delay information corresponding to some or all reference signal resources in the plurality of reference signal resources, and the first channel information comprises channel information of each of the plurality of reference signal resources;
performing, by the communication apparatus, delay difference compensation on the first channel information based on the first delay information, to determine second channel information;
determining, by the communication apparatus, a precoding matrix indicator (PMI) based on the second channel information, wherein the PMI indicates the second channel information; and
reporting, by the communication apparatus, the first delay information and the PMI.

2. The method according to claim 1, wherein the determining, by the communication apparatus, first delay information based on the plurality of reference signals comprises:
measuring, by the communication apparatus, an air interface delay of some or all reference signals in the plurality of reference signals relative to a first reference signal, and determining an air interface delay difference of the some or all reference signals, wherein the first reference signal is one of the plurality of reference signals; and
determining, by the communication apparatus, the first delay information based on the air interface delay difference of the some or all reference signals.

3. The method according to claim 2, wherein the first delay information comprises the air interface delay difference of the some or all reference signals.

4. The method according to claim 2, wherein the determining, by the communication apparatus, the first delay information based on the air interface delay difference of the some or all reference signals comprises:
determining, by the communication apparatus, the first delay information based on the air interface delay difference of the some or all reference signals and a first mapping table, wherein the first mapping table indicates a mapping relationship between an air interface delay difference range of a reference signal and a preset delay offset corresponding to a reference signal resource, and the first delay information indicates respective delay offsets of the some or all reference signal resources corresponding to the some or all reference signals.

5. The method according to claim 4, wherein the first delay information comprises a plurality of index values, and one of the plurality of index values indicates a delay offset of one of the some or all reference signal resources.

6. The method according to claim 2, wherein
the air interface delay difference of the some or all reference signals comprises a delay difference of a main path, of each of the some or all reference signals, relative to a main path of the first reference signal; or
the air interface delay difference of the some or all reference signals comprises a delay difference of a first path, of each of the some or all the reference signals, relative to a first path of the first reference signal.

7. The method according to claim 1, wherein the performing, by the communication apparatus, delay difference compensation on the first channel information based on the first delay information comprises:
performing, by the communication apparatus, linear phase compensation on the first channel information in frequency domain based on the first delay information, so that main paths or first paths of channel information of the plurality of reference signal resources are aligned.

8. A communication apparatus, comprising:
at least one processor configured with processor-executable instructions to perform operations comprising measuring a plurality of reference signals based on a plurality of reference signal resources;
determining first delay information and first channel information based on the plurality of reference signals, wherein the first delay information comprises delay information corresponding to some or all reference signal resources in the plurality of reference signal resources, and the first channel information comprises channel information of each of the plurality of reference signal resources;
performing delay difference compensation on the first channel information based on the first delay information, to determine second channel information; and
determining a precoding matrix indicator (PMI) based on the second channel information, wherein the PMI indicates the second channel information; and
reporting the first delay information and the PMI.

9. The communication apparatus according to claim 8, wherein the at least one processor is further configured with processor-executable instructions to perform operations comprising:
measuring an air interface delay of some or all reference signals in the plurality of reference signals relative to a first reference signal, and determine an air interface delay difference of the some or all reference signals, wherein the first reference signal is one of the plurality of reference signals; and determining the first delay information based on the air interface delay difference of the some or all reference signals.

10. The communication apparatus according to claim 9, wherein the first delay information comprises the air interface delay difference of the some or all reference signals.

11. The communication apparatus according to claim 9, wherein the at least one processor is further configured with processor-executable instructions to perform operations comprising:

determining the first delay information based on the air interface delay difference of the some or all reference signals and a first mapping table, wherein the first mapping table indicates a mapping relationship between an air interface delay difference range of a reference signal and a preset delay offset corresponding to a reference signal resource, and the first delay information indicates respective delay offsets of the some or all reference signal resources corresponding to the some or all reference signals.

12. The communication apparatus according to claim 11, wherein the first delay information comprises a plurality of index values, and one of the plurality of index values indicates a delay offset of one of the some or all reference signal resources.

13. The communication apparatus according to claim 9, wherein the air interface delay difference of the some or all reference signals comprises a delay difference of a main path, of each of the some or all reference signals, relative to a main path of the first reference signal; or the air interface delay difference of the some or all reference signals comprises a delay difference of a first path, of each of the some or all reference signals, relative to a first path of the first reference signal.

14. The communication apparatus according to claim 8, wherein the at least one processor is further configured with processor-executable instructions to perform operations comprising:

performing linear phase compensation on the first channel information in frequency domain based on the first delay information, so that main paths or first paths of channel information of the plurality of reference signal resources are aligned.

15. A non-transitory computer-readable storage medium storing computer instructions, that when executed by at least one processor, cause the at least one processor to perform operations comprising:

measuring a plurality of reference signals based on a plurality of reference signal resources;

determining first delay information and first channel information based on the plurality of reference signals, wherein the first delay information comprises delay information corresponding to some or all reference signal resources in the plurality of reference signal resources, and the first channel information comprises channel information of each of the plurality of reference signal resources;

performing delay difference compensation on the first channel information based on the first delay information, to determine second channel information; and determining a precoding matrix indicator (PMI) based on the second channel information, wherein the PMI indicates the second channel information; and reporting the first delay information and the PMI.

16. The non-transitory computer-readable storage medium according to claim 15, wherein the computer instructions, when executed by at least one processor, further cause the at least one processor to perform operations comprising:

measuring an air interface delay of a some or all reference signals in the plurality of reference signals relative to a first reference signal, and determine an air interface delay difference of the some or all reference signals, wherein the first reference signal is one of the plurality of reference signals; and determining the first delay information based on the air interface delay difference of the some or all reference signals.

17. The non-transitory computer-readable storage medium according to claim 16, wherein the first delay information comprises the air interface delay difference of the some or all reference signals.

18. The non-transitory computer-readable storage medium according to claim 16, wherein the computer instructions, when executed by at least one processor, further cause the at least one processor to perform operations comprising:

determining the first delay information based on the air interface delay difference of the some or all reference signals and a first mapping table, wherein the first mapping table indicates a mapping relationship between an air interface delay difference range of a reference signal and a preset delay offset corresponding to a reference signal resource, and the first delay information indicates respective delay offsets of the some or all reference signal resources corresponding to the some or all reference signals.

19. The non-transitory computer-readable storage medium according to claim 18, wherein the first delay information comprises a plurality of index values, and one of the plurality of index values indicates a delay offset of one of the some or all reference signal resources.

20. The non-transitory computer-readable storage medium according to claim 15, wherein the computer instructions, when executed by at least one processor, further cause the at least one processor to perform operations comprising:

performing linear phase compensation on the first channel information in frequency domain based on the first delay information, so that main paths or first paths of channel information of the plurality of reference signal resources are aligned.

* * * * *